United States Patent [19]

Hershey et al.

[11] Patent Number: 5,414,833
[45] Date of Patent: May 9, 1995

[54] NETWORK SECURITY SYSTEM AND METHOD USING A PARALLEL FINITE STATE MACHINE ADAPTIVE ACTIVE MONITOR AND RESPONDER

[75] Inventors: Paul C. Hershey; Donald B. Johnson; An V. Le; Stephen M. Matyas, all of Manassas, Va.; John G. Waclawsky, Frederick, Md.; John D. Wilkins, Somerville, Va.

[73] Assignee: International Business Machines Corporation, Armonk, N.Y.

[21] Appl. No.: 144,161

[22] Filed: Oct. 27, 1993

[51] Int. Cl.⁶ ............................................. H04L 9/00
[52] U.S. Cl. ...................................... 395/575; 380/4; 380/49
[58] Field of Search ................... 395/575; 380/4, 21, 380/25, 42, 49

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 364/200 |
| 4,459,656 | 7/1984 | Wilder, Jr. | 364/200 |
| 4,521,849 | 6/1985 | Wilder, Jr. | 364/200 |
| 4,779,194 | 10/1988 | Jennings et al. | 364/200 |
| 4,805,089 | 2/1989 | Lane et al. | 364/188 |
| 4,851,998 | 7/1989 | Hospodor | 364/200 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | |
| 5,035,302 | 7/1991 | Thangavelu | 187/125 |
| 5,051,886 | 9/1991 | Kawaguchi et al. | 395/575 |
| 5,062,055 | 10/1991 | Chinnaswamy et al. | 364/513 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,319,776 | 6/1994 | Hile et al. | 395/575 |

FOREIGN PATENT DOCUMENTS 61-53855 3/1986 Japan .

Primary Examiner—Charles E. Atkinson
Attorney, Agent, or Firm—Joseph C. Redmond, Jr.; John E. Hoel; John D. Flynn

[57] ABSTRACT

A system and method provide a security agent, consisting of a monitor and a responder, that respond to a detected security event in a data communications network, by producing and transmitting a security alert message to a network security manager. The alert is a security administration action which includes setting a flag in an existing transmitted protocol frame to indicate a security event has occurred. The security agent detects the transmission of infected programs and data across a high-speed communications network. The security agent includes an adaptive, active monitor using finite state machines, that can be dynamically reprogrammed in the event it becomes necessary to dynamically reconfigure it to provide real time detection of the presence of a suspected offending virus.

45 Claims, 23 Drawing Sheets

SECURITY ALERT MESSAGE    341

| SECURITY AGENT IDENTIFIER | 321 |
| --- | --- |
| SECURITY CODE<br>    CATEGORY<br>    TYPE | 322<br>323<br>324 |
| SEQUENCE NUMBER COUNTER | 325 |

FIG. 7

EXTENDED SECURITY ALERT MESSAGE   341

| SECURITY AGENT IDENTIFIER | 321 |
| --- | --- |
| SECURITY CODE<br>    CATEGORY<br>    TYPE | 322<br>323<br>324 |
| SEQUENCE NUMBER COUNTER | 325 |
| PATTERN ALARM COUNTER VALUE | 326 |

FIG. 9

EXAMPLE EMBODIMENT OF PATTERN ALARMS AND COUNTERS
FOR FIG. 8 CONFIGURED FOR VIRUS DETECTION:

FIG. 12

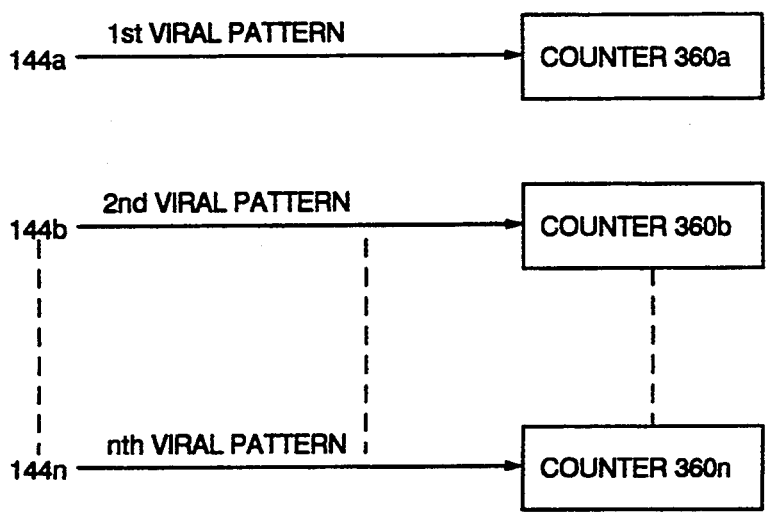

FIG. 15

| LAYER: | FUNCTION: |
|---|---|
| LAYER 7 APPLICATION LAYER | * PROVIDES ACCESS TO THE COMMUNICATIONS ENVIRONMENT FOR APPLICATIONS AND USERS |
| LAYER 6 PRESENTATION LAYER | * PROVIDES TRANSLATION OF DATA REPRESENTATION (SYNTAX), E.G., ASCII TO EBCDIC |
| LAYER 5 SESSION LAYER | * ESTABLISHES, MANAGES, AND TERMINATES SESSIONS BETWEEN COOPERATING, COMMUNICATING APPLICATIONS |
| LAYER 4 TRANSPORT LAYER | * PROVIDES RELIABLE, ERROR-FREE END-TO-END TRANSFER OF DATA INCLUDING ERROR RECOVERY AND FLOW CONTROL |
| LAYER 3 NETWORK LAYER | * PROVIDES DATA SWITCHING AND ROUTING CAPABILITIES TO ESTABLISH AND MAINTAIN END-TO-END CONNECTIVITY |
| LAYER 2 DATA LINK LAYER | * PROVIDES FOR THE RELIABLE TRANSFER OF DATA FROM POINT-TO-POINT, I.E., ACROSS A SINGLE PHYSICAL LINK |
| LAYER 1 PHYSICAL LAYER | * CONCERNED WITH THE ELECTRICAL TRANSMISSION OF THE BIT STREAM OVER THE NETWORK MEDIA |

KEY: DSAP - DESTINATION SERVICE ACCESS POINT
SSAP - SOURCE SERVICE ACCESS POINT
CONT - CONTROL

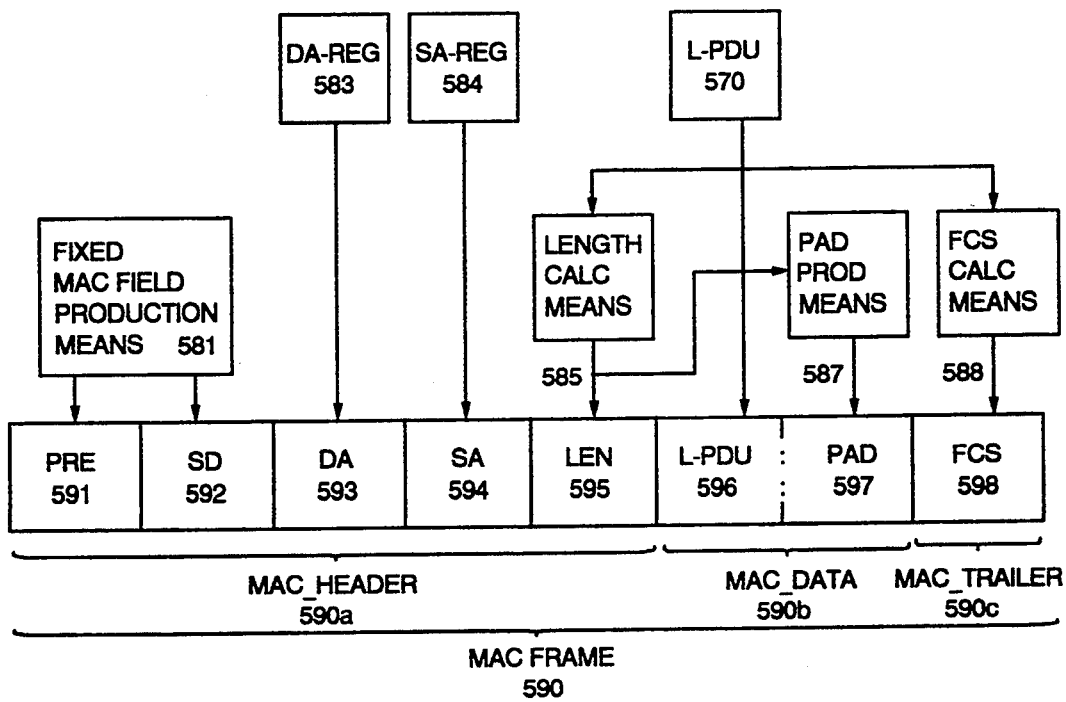
KEY: PRE - PREAMBLE
SD - STARTING DELIMITER
DA - DESTINATION (MAC) ADDRESS
SA - SOURCE (MAC) ADDRESS
LEN - LENGTH
L-PDU - LLC PDU FROM LLC LAYER
PAD - PADDING (OPTIONAL)
FCS - FRAME CHECK SEQUENCE
FIG. 20
FIG. 21
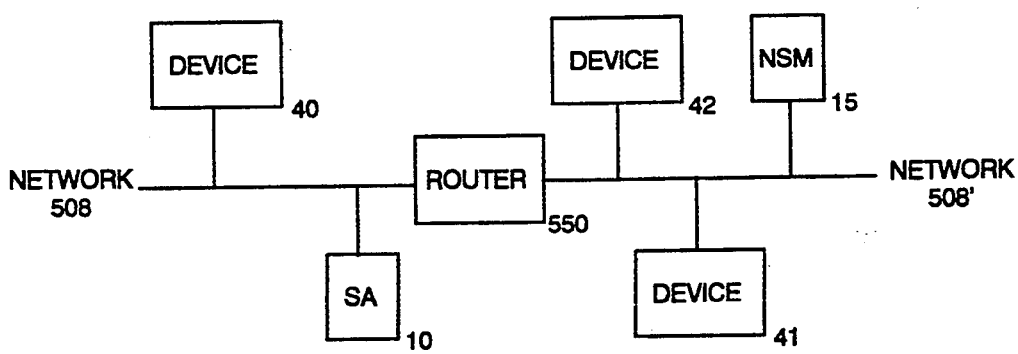

NETWORK SECURITY SYSTEM AND METHOD USING A PARALLEL FINITE STATE MACHINE ADAPTIVE ACTIVE MONITOR AND RESPONDER

BACKGROUND OF THE INVENTION

1. Technical Field

The invention disclosed broadly relates to data processing systems and methods and more particularly relates to systems and methods for finite state machine processing in a multimedia data communications environment and to systems and methods for use in a data processing system to enhance network security.

2. Related Patents and Patent Applications

This patent application is related to the copending U.S. patent application Ser. No. 08/024,572, filed Mar. 1, 1993, entitled "Information Collection Architecture and Method for a Data Communications Network," by J. G. Waclawsky, et al., assigned to the IBM Corporation and incorporated herein by reference.

This patent application is also related to the copending U.S. patent application, Ser. No. 08/024,575, filed Mar. 1, 1993, entitled "Event Driven Interface for a System for Monitoring and Controlling a Data Communications Network," by P. C. Hershey, et al., assigned to the IBM Corporation and incorporated herein by reference.

This patent application is also related to the copending U.S. patent application, Ser. No. 08/024,542, filed Mar. 1, 1993, entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application, Ser. No. 08/138,045, filed Oct. 15, 1993, entitled "System and Method for Adaptive, Active Monitoring of a Serial Data Stream Having a Characteristic Pattern," by P. C. Hershey, et al., assigned to the IBM Corporation and incorporated herein by reference.

This patent application is also related to U.S. Pat. No. 4,918,728, issued Apr. 17, 1988 entitled "Data Cryptography Operations Using Control Vectors" by S. M. Matyas, et al., assigned to the IBM Corporation and incorporated herein by reference.

This patent application is also related to the copending U.S. patent application, Ser. No. 08/004,872, filed Jan. 19, 1993, entitled "An Automatic Immune System for Computers and Computer Networks," by W. C. Arnold, et al., assigned to the IBM Corporation and incorporated herein by reference.

This patent application is also related to copending U.S. patent application, Ser. No. 08/004,871, filed Jan. 19, 1993, entitled "Methods and Apparatus for Evaluating and Extracting Signatures of Computer Viruses and Other Undesirable Software Entities," by J. O. Kephart, assigned to the IBM Corporation and incorporated herein by reference.

3. Background Art

Network security is largely concerned with (1) protecting information from unauthorized disclosure (i.e., information security), (2) protecting information from unauthorized modification or destruction (i.e., information integrity), and (3) ensuring the reliable operation of the computing and networking resources. Cryptography is often used to protect the secrecy and integrity of stored and transmitted data. Ensuring the reliable operation of computing and networking resources is fundamentally a harder problem to solve—one must ensure the functional correctness of the system. The term "reliable operation" means that a system operates correctly, in the way it was intended.

A well-rounded approach to computer and network security will balance the use of cryptographic techniques—for protecting the secrecy and integrity of data—and monitoring techniques—for detecting anomalous network conditions (security events) that may signal the presence of an intruder or intruder agent. A network security administrator, so-notified of a potential intruder or intruder agent, may take one or more possible actions in response to such a notification. Provided that the response is timely, the possible harmful effects of an intruder or intruder agent may be prevented or minimized or localized. Detecting a problem, or potential problem, seems to be the first step in coping with the problem.

Today's high-speed (gigabit per second) multimedia networks consisting of WANs (wide area networks) and LANs (local area networks) can be thought of as a single computing resource comprised of many smaller computing resources spread over a large geographical area. The network as a whole provides network-wide services to its users, in a transparent fashion. It must be capable of communicating voice, image, and text, to name a few. In this new environment, the ability to monitor data flowing over a network, and the ability to react to anomalous conditions, in real time through appropriate network-level actions, seems fundamental to the maintenance of reliable network-wide services.

The co-pending patent application by Hershey et al. entitled "System and Method for Adaptive, Active Monitoring of a Serial Data Stream Having a Characteristic Pattern", Ser. No. 08/138,045 describes a programmable method for detecting characteristic data patterns of diverse size transmitted over high-speed data links. Unlike more traditional method in data is sampled and stored in a log, the finite state machine (FSM) information monitoring means of the Hershey invention, cited above, is programmed to "look" for interesting patterns of concern. In this way, the FSM discards most of the high-speed information bits and concentrates only on patterns of interest. In short, the FSM signals a pattern match as opposed to collecting and storing data in a log, which must then be processed by some other network function. The FSM information monitoring means is coupled to the network, and in response to detecting a prescribed pattern, outputs a control signal to the network to alter communication characteristics thereof. How this control signal is handled depends on the application supported by the FSM information monitoring means. The Hershey et al. application, Ser. No. 08/138,045 is limited in its teaching of how systems can respond to the detection of prescribed patterns, concentrating more of the problem of pattern detection itself. Moreover, the Hershey application, referred to above as well as other prior art, does not teach a unified method for (a) monitoring of security events—virus patterns, natural language patterns, and intrusion detection patterns—on high-speed communication links, (b) reporting detected security events to a network security manager, and (c) responding on a network-level to detected security events as a means to thwart, counter, minimize, or isolate their possible harmful effects.

3.1 Virus Detection

A virus is a computer program that (1) propagates itself through a system or network of systems and (2) appears to the user to perform a legitimate function but in fact carries out some illicit function that the user of the program did not intend. See M. Gasser, "Building a Secure Computer System," Van Nostrand Reinhold, N.Y., 1988. A computer virus has been defined by Frederick B. Cohen (A Short Course on Computer Viruses, page 11), as a program that can infect other programs by modifying them to include a, possibly evolved, version of itself. As employed herein, a computer virus is considered to include an executable assemblage of computer instructions or code that is capable of attaching itself to a computer program. The subsequent execution of the viral code may have detrimental effects upon the operation of the computer that hosts the virus. Some viruses have an ability to modify their constituent code, thereby complicating the task of identifying and removing the virus. Another type of undesirable software entity is known as a "Trojan Horse." A Trojan Horse is a block of undesired code that is intentionally hidden within a block of desirable code. A virus is typically identified by a 'signature', i.e., a sequence of data bits sufficient to distinguish the virus from other data, or sufficient to raise a warning flag that a virus may be present. In the latter case, further checking and identification of the candidate virus must be performed.

Viruses can be detected by two primary means: (1) modification detection and (2) pattern detection via a scanner. With modification detection, checksums or cryptographic hash values are used to detect changes in executable codes. These changes are reported to a system manager who then decides whether the change is expected (e.g., due to a recent software upgrade) or unexpected (e.g., due to viral infection or unauthorized modification). This method usually requires manual intervention to add, delete, or modify system files in order to ensure adequate coverage and to limit the number of false alarms. A list of checksums must be maintained for all files to be protected. This method is not practical in a high-speed communications environment for several reasons: (1) the overhead imposed by computing checksums, (2) the unpredictability of data flowing on the communications medium, and (3) the requirement for transporting and storing reference checksums for use in comparing with the computed checksums.

A widely-used method for the detection of computer viruses and other undesirable software entities is known as a scanner. A scanner searches through executable files, boot records, memory, and any other areas that might harbor executable code, for the presence of known undesirable software entities. Typically, a human expert examines a particular undesirable software entity in detail and then uses the acquired information to create a method for detecting it wherever it might occur. In the case of computer viruses, Trojan Horses, and certain other types of undesirable software entities, the detection method that is typically used is to search for the presence of one or more short sequences of bytes, referred to as signatures, which occur in that entity. The signature(s) must be chosen with care such that, when used in conjunction with a suitable scanner, they are highly likely to discover the entity if it is present, but seldom give a false alarm, known as a false positive. The requirement of a low false positive rate amounts to requiring that the signature(s) be unlikely to appear in programs that are normally executed on the computer. Typically, if the entity is in the form of binary machine code, a human expert selects signatures by transforming the binary machine code into a human-readable format, such as assembler code, and then analyzes the human-readable code. In the case where that entity is a computer virus, the expert typically discards portions of the code which have a reasonable likelihood of varying substantially from one instance of the virus to another. Then, the expert selects one or more sections of the entity's code which appear to be unlikely to appear in normal, legitimate programs, and identifies the corresponding bytes in the binary machine code so as to produce the signature(s). The expert may also be influenced in his or her choice by sequences of instructions that appear to be typical of the type of entity in question, be it a computer virus, Trojan horse, or some other type of undesirable software entity.

With pattern detection via a scanner, system files are periodically scanned for patterns, which consist of a set of pre-defined virus "signatures." Pattern matches are reported to the system manager who then decides whether the match represents a misdiagnosis or an actual viral infection. A virus consists of one or more fixed-length signature patterns, so the number of virus signatures is proportional to the number of viruses. A list of virus signatures must be maintained for each virus. The pattern search usually proceeds in a serial fashion, scanning each file one at a time, comparing the records of the file with each signature pattern in turn. This form of pattern detection is not suitable for a high speed communications environment because of the delay caused by the serial, fixed-signature search pattern. In a high speed communications environment, it would be desirable to search for many different signature patterns in parallel.

Currently, a number of commercial computer virus scanners are successful in alerting users to the presence of viruses that are already known. However, scanners may not be able to find computer viruses for which they have not been programmed explicitly. The problem of dealing with new viruses has typically been addressed by distributing updates of scanning programs and/or auxiliary files containing the necessary information about the latest viruses. However, the increasing rate at which new viruses are being written is widening the gap between the number of viruses that exist and the number of viruses that can be detected by an appreciable fraction of computer users. Thus it is becoming increasingly likely that a new virus will become wide-spread before any remedy is generally available.

It has become clear to many people in the industry that methods for automatically recognizing and eradicating previously unknown or unanalyzed viruses must be developed and installed on individual computers and computer networks. There are a number of articles addressing this problem. In an article entitled "Automated Program Analysis for Computer Virus Detection," by W. C. Arnold, et al, IBM Technical Disclosure Bulletin, July 1991, page 415, is directed to the potential behavior of program objects to determine heuristically whether they may contain computer viruses or similar threats.

An article entitled "The SRI IDES Statistical Anomaly Detector," H. S. Javitz and A. Valdes, Proceedings of the 1991 IEEE Computer Society Symposium on Research in Security and Privacy, pp. 316-326 is directed to a statistical approach to anomaly detection.

An article entitled "Towards a Testbed for Malicious Code Detection," by R. Lo, P. Kerchen, R. Crawford, W. Ho, and J. Crossley, Lawrence Livermore National Lab Report UCRL-JC-105792, 1991, which describes static and dynamic analysis tools which have been shown to be effective against certain types of malicious code. Such an idea represents another form of anomaly detection.

Copending U.S. patent application Ser. No. 08/004,872, filed Jan. 19, 1993, entitled "An Automatic Immune System for Computers and Computer Networks," by W. C. Arnold, et al., cited above in Related Patents and Patent Applications, describes a method by which a computer can detect the presence of and respond automatically to a computer virus or other undesirable software entity. If the computer is connected to others via a network, it can warn its neighbors about that entity and inform them about how to detect it. The invention provides methods and apparatus to automatically detect and extract a signature from an undesirable software entity, such as a computer virus or worm. It further provides methods and apparatus for immunizing a computer system, and also a network of computer system, against a subsequent infection by a previously unknown and undesirable software entity.

Copending U.S. patent application Ser. No. 08/004,871, filed Jan. 19, 1993, entitled "Methods and Apparatus for Evaluating and Extracting Signatures of Computer Viruses and Other Undesirable Software Entities," by J. O. Kephart, cited above in Related Patents and Patent Applications, describes an automatic computer implemented procedure for extracting and evaluating computer virus signatures. It further provides a statistical computer implemented technique for automatically extracting signatures from the machine code of a virus and for evaluating the probable effectiveness of the extracted signatures in identifying a subsequent instance of the virus.

The described methods of virus detection (modification detection and pattern detection) are based on identifying a viral infection in a stored form of the data—after the infection has already taken place. A different, highly parallel method is required in order to detect the transfer of viral agents across a high-speed communications link where one "looks" for a viral pattern as it flashes past a monitor attached to the bit stream. The Hershey, et al. adaptive, active monitor described in copending U.S. patent application, Ser. No. 08/138,045, filed Oct. 15, 1993, entitled "System and Method for Adaptive, Active Monitoring of a Serial Data Stream Having a Characteristic Pattern," cited above in Related Patents and Patent Applications, is particularly well-suited for scanning of virus signatures in a high-speed communications environment. The prior art with respect to virus detection, virus scanning, signature preparation, virus reporting, etc. is well defined and described as pointed out above. However, the prior art does not teach how to construct a virus scanning apparatus well-suited to very high-speed networks, and more particularly how such an apparatus could be constructed for attachment to a bit stream as a singular entity, integrated within a network-attached device or standing alone, whose purpose is to act as a monitoring and responding device for assuring the integrity and security of a high-speed communications network.

3.2 Natural Language Detection

Natural language detection admits a range of applications which include (1) detection of inappropriate word use in a business environment (e.g., 4-letter words), (2) detection of inappropriate discourse within a business environment (e.g., use of company computer resources for conducting personal business), (3) detection of sensitive words such as the words "Company Confidential" that may signal the transmission of clear information that should be encrypted or the words "copyright protected" that may signal a possible violation of copyright law, and (4) detection of clear versus encrypted data that may signal a possible violation of company policy requiring all traffic on a link to be encrypted.

Each of the natural language detection applications has a range of possible actions that may be taken in response to a detected offending pattern.

3.3 Intrusion Detection

One form of intrusion of particular concern to network security is an adversary who attempts to gain access to a system by issuing repeated login requests. In this case, intrusion detection is aimed at detecting a higher-than-normal frequency of login sequences indicating that someone is repeatedly attempting to login by guessing userids and passwords. In this security application, one does not merely detect the presence of a pattern but the presence of a higher-than-normal frequency of patterns.

Most security applications (including virus detection, natural language detection, and intrusion detection) consist of a detection step and a response step. The Hershey FSM information monitoring means described in U.S. pending patent application Ser. No. 08/138,045, cited above, is particularly suited as a pattern detection means in a high-speed communication environment. Yet for the Hershey FSM information monitoring means to be well-suited as a security device in a high-speed communication environment, it must be adapted to search for patterns particular to security applications and it must be extended to provide a capability for responding, in appropriate ways, to detected patterns. Such a security device (hereinafter called a security agent) must provide both an information monitoring function as well as a real-time responding function.

OBJECTS OF THE INVENTION

It is an object of the invention to provide a security agent consisting of a monitoring means and a responding means which can support security applications.

It is another object of the invention to provide a security agent capable of responding to a detected security event by producing and transmitting a security alert message to a network security manager.

It is another object of the invention to provide a security agent capable of responding to a detected security event by taking a network security administration action consisting of transmitting a security alert to other stations on the network.

It is another object of the invention to provide a security agent capable of responding to a detected security event by taking a network security administration action consisting of setting a flag in an existing transmitted protocol frame to indicate a security event has occurred.

It is another object of the invention to provide a security agent capable of detecting the transmission of infected programs and data across a high-speed communications network.

It is another object of the invention to provide a security agent with an information monitoring means that can be re-programmed in case it is necessary to dynamically reconfigure it to provide a capability in real-time to detect the presence of a suspected offending virus.

It is another object of the invention to provide a security agent capable of detecting inappropriate words, detecting use of computing resources for non-authorized uses (e.g., non-business purposes), detecting the presence of copyright protected data, detecting the presence of company confidential information, and detecting the presence of clear data as opposed to encrypted data—any of which may signal a violation of policy.

It is another object of the invention to provide a security agent capable of detecting intrusions by an adversary who attempts to gain access to a system using repeated login requests.

SUMMARY OF THE INVENTION

These and other objects, features and advantages are accomplished by the invention disclosed herein. A system and method are disclosed which provides a security agent, consisting of a monitoring means and a responding means, which responds to a detected security event in a data communications network, by producing and transmitting a security alert message to a network security manager. The alert is a security administration action which includes setting a flag in an existing transmitted protocol frame to indicate a security event has occurred.

The security agent detects the transmission of infected programs and data across a high-speed communications network. The security agent includes an information monitoring means, consisting of adaptive, active monitor using finite state machines, that can be dynamically re-programmed in case it is necessary to dynamically reconfigure it to provide a capability in real-time to detect the presence of a suspected offending virus.

In an alternate embodiment of the invention, the security agent detects inappropriate words, detecting use of computing resources for non-authorized uses (e.g., non-business purposes), detecting the presence of copyright protected data, detecting the presence of company confidential information, and detecting the presence of clear data as opposed to encrypted data—any of which may signal a violation of policy. In another alternate embodiment of the invention, the security agent detects intrusions by an adversary who attempts to gain access to a system using repeated login requests.

DESCRIPTION OF THE FIGURES

These and other objects, features and advantages will be more fully appreciated with reference to the accompanying figures.

FIG. 7 depicts a security alert message 341 consisting of a security agent identifier 321, a security code 322 and a sequence number counter 325.

FIG. 9 depicts an extended security alert message 341 consisting of a security agent identifier 321, a security code 322, a sequence number counter 325, and a pattern alarm counter value 326.

FIG. 12 is an example embodiment of pattern alarms and counters of FIG. 8 configured for virus detection.

FIG. 15 depicts the 7-layer communications architecture of the Open Systems Interconnection (OSI) model.

FIG. 20 is a block diagram of the implemented Media Access Control sub-layer of the Data Link Layer in the Network Access Method of the SA.

FIG. 21 is a block diagram illustrating a Security Agent 10 in a first network segment communicating through a router internetworking device to a Network Security Manager 15 in a second network segment.

DISCUSSION OF THE PREFERRED EMBODIMENT

Figures 1, 1A:
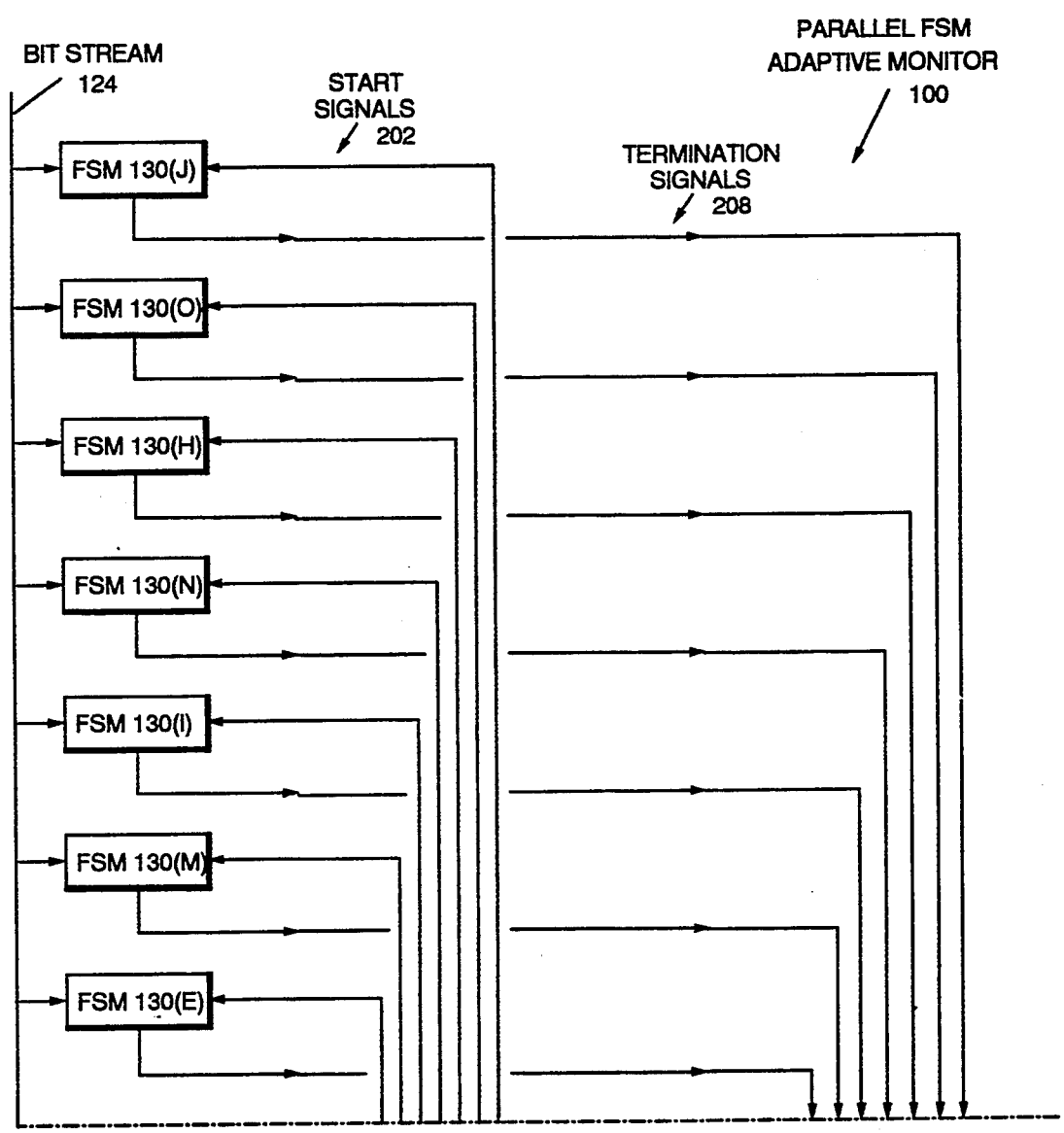
FIG. 1A is a functional block diagram of a parallel finite state machine adaptive monitor, in accordance with the invention.

In accordance with the invention, a security agent incorporates both (1) an adaptive, active monitoring means and (2) a responding means. The adaptive, active monitoring means is based on the adaptive, active monitoring means taught in copending patent application by Paul Hershey and John Waclawsky, entitled 'System and Method for Adaptive, Active Monitoring of a Serial Data Stream Having a Characteristic Pattern', Ser. No. 08/138,045 cited above under Related Patents and Patent Applications, assigned to the IBM Corporation and incorporated herein by reference. The responding means, when coupled to the adaptive, active monitoring means, provides the functionality necessary to implement a security agent in a high-speed communication environment.

The uses and features of the adaptive, active monitor can be summarized.

The adaptive, active monitor is useful in detecting characteristic data patterns in messages on a high-speed data network, such as starting delimiters, tokens, various types of frames, and protocol information. Such serial data streams include serial patterns of binary bits, and can also include serial patterns of multiple state symbols, such as the J, K, 0, 1 symbols (four states) of token ring networks. Such serial data streams can further include multiple state symbols in fiber optical distributed data interface (FDDI) networks.

Characteristic data patterns such as these, include component bit patterns, some of which are common among several characteristic data patterns. For example, a starting delimiter bit pattern is a common component which begins many other characteristic data patterns such as a token, a MAC frame, and a beacon frame in the IEEE 802.5 token ring protocol. The occurrence of multiple component bit patterns in a characteristic data pattern can be generalized by referring to a first component pattern which is followed by a second component pattern.

The adaptive, active monitor comprises two finite state machines (FSM) which are constructed to detect the occurrence of a characteristic data pattern having two consecutive component bit patterns. The first FSM is called the predecessor FSM, and it is configured to detect the first component pattern. The second FSM is called the successor FSM, and it is configured to detect the second component pattern. The first FSM will send a starting signal to the second FSM, when the first FSM has successfully detected the first component pattern. The starting signal initializes the second FSM, to take over the analysis of the portion of the bit stream which follows the first component pattern. If the second FSM successfully detects the second component pattern, it then outputs a pattern alarm signal, indicating the successful detection of the entire characteristic data pattern.

Another feature of the adaptive, active monitor is the accommodation of a component bit pattern which is common to two or more distinctly different characteristic data patterns. For example, a first characteristic data pattern is composed of a first-type component bit pattern followed by a second-type component bit pattern. A second characteristic data pattern is composed of the same first-type component bit pattern followed by a third type component bit pattern. A first FSM is configured to detect the first component pattern, a second FSM is configured to detect the second component pattern, and a third FSM is configured to detect the third component pattern. The objective is to detect either one of the two characteristic data patterns. The predecessor FSM will have a plurality of successor FSMs which run simultaneously in parallel. The first FSM will send a starting signal to both the second FSM and to the third FSM, when the first FSM has successfully detected the first component pattern. The starting signal initializes the second FSM, to take over the analysis of the bit stream which follows the first component pattern, to look for the second component bit pattern. And the starting signal initializes the third FSM, to take over the analysis of the same bit stream which follows the first component pattern, to look for the third component bit pattern. The second FSM and the third FSM run simultaneously in parallel and are mutually independent. They both run until one of them fails or one of them succeeds in finding its designated component bit pattern.

In this manner, the speed of detection of a characteristic data pattern is increased, the number of components is decreased, and effective, real time control can be achieved for high speed data networks.

Still another feature of the adaptive, active monitor is the programmability of the FSMs and the programmability of their interconnection. Each FSM consists of an address register and a memory. The address register has two portions, an n-X wide first portion and a X-bit wide second portion X. X is one bit for binary data, X is a word of two bits for Manchester encoded data, or X is a word of five bits for FDDI encoded data. The X-bit wide portion is connected to the input data stream which contains the characteristic data pattern of interest. The n-X bit wide portion contains data which is output from the memory. The next address to be applied by the address register to the memory is made up of the X-1 bit wide portion and the next arriving X-bit word from the input data stream.

Each memory has a plurality of data storage locations, each having a first portion with n-X bits, to be output to the address register as part of the next address. Many of the memory locations have a second portion which stores a command to reset the address register if the FSM fails to detect its designated component bit pattern.

A terminal location in the memory of an FSM will include a start signal value to signal another FSM to start analyzing the data stream. If the terminal location in a predecessor FSM memory is successful in matching the last bit of its designated component bit pattern, then it will output a starting signal to a succeeding FSM. The succeeding FSM will begin analyzing the data stream for the next component bit pattern of the characteristic data pattern. The memory of an FSM can be a writable RAM, enabling its reconfiguration to detect different component bit patterns.

Another feature contributing to the programmability of the adaptive, active monitor is the inclusion of a programmable cross point switch, which enables the starting signals from predecessor FSMs to be directed to different successor FSMs. This enables changing the order and combination of FSMs performing analysis of a bit stream, to detect differently organized characteristic data patterns.

Another feature of the adaptive, active monitor is its functioning in an information collection architecture, to monitor the traffic on a network and to provide event counts for the occurrence of data patterns which are used to control the characteristics of the network.

Further, diverse sized characteristic data patterns can be detected. For example, if when monitoring the 10-bit pattern it is determined that more than 10 bits of information are required, the adaptive monitor feature may be dynamically altered to change the length of the pattern that can be detected. This ability provides increased insight into the characteristics of the data stream.

Another feature of the adaptive, active monitor is its ability to receive serial data streams which include serial patterns of multiple state symbols such as in token ring networks and in fiber optical distributed data interface (FDDI) networks.

The adaptive, active monitor can be embodied as a plurality of FSM integrated circuit chips which are connected in common to receive the input bit stream and which are programmably interconnected to transfer start signals. The adaptive, active monitor can also be embodied as a unitary VLSI circuit chip. And the adaptive, active monitor can also be embodied as a plurality of FSM program task partitions in the memory of a multi-tasking processor.

An additional feature of the adaptive, active monitor is an information collection architecture system, with an adaptable, simultaneously parallel array of finite state machines, for monitoring a data communications network. The system includes an array of at least three finite state machines, embodied on a VLSI circuit chip or alternately in separate task partitions of a multitasked data processor. Each finite state machine in the array, includes a memory, an address register coupled to the network, a start signal input and a pattern detection output coupled to a counter, the memory thereof storing a finite state machine definition for detecting a unique data pattern on the network. Each machine can detect a different pattern. A programmable interconnection means is coupled to the finite state machines in the array, for selectively interconnecting the pattern detection outputs to the start signal inputs. An event vector assembly means, has inputs coupled to the counters, for assembling an event vector from an accumulated count value in the counters, representing a number of occurrences of the data patterns on the network. An information collection means, has an input coupled to the event vector assembly means, an array output coupled to the memories of the finite state machines, and a configuration output coupled to the programmable inter connection means, for receiving the event vector and in response thereto, changing the array to change data patterns to be detected on the network.

The information collection means, in response to receiving the event vector, changes a first interconnection arrangement of the first pattern detection output being connected to the second start signal input, to a second interconnection arrangement of the first pattern detection output being connected to the third start signal input. This changes the composite pattern to be detected. Further, the information collection means, in response to receiving the event vector, changes a first interconnection arrangement of the first pattern detection output being connected to the second start signal input, to a second interconnection arrangement of the first pattern detection output being connected to both the second start signal input and to the third start signal input. This creates a simultaneous, parallel finite state machine operation. Further, the information collection means, in response to receiving the event vector, outputs new finite machine definition data to at least the first memory to change the first data pattern to be detected.

Further, the information collection means is coupled to the network, and in response to receiving the event vector, outputs a control signal to the network to alter communication characteristics thereof. The resulting information collection architecture system provides a flexible, rapidly reconfigurable means to monitor and control data communications networks, through real time monitoring of the data patterns in their traffic.

Now that the uses and features of the adaptive, active monitor have been summarized, the concept and operation of the adaptive, active monitor can be summarized.

The principle of the adaptive active monitoring invention is shown in FIGS. 1A–1F. The adaptive active monitoring invention, monitors a serial data stream having a characteristic pattern. It detects characteristic data patterns in messages on a high speed data network, starting delimiters, tokens, various types of frames such as a MAC frame, a beacon frame, message frames, etc., and other protocol information. Such data streams typically include serial patterns of binary bits. However, some communications protocols, such as the IEEE 802.5 token ring protocol, have multiple state symbols such as the J, K, 0 and 1 symbols (four states), and they can also be accommodated by the invention. The IEEE 802.5 token ring protocol is described in the IEEE Standard 802.5, token ring access method, available from IEEE Incorporated, New York, N.Y., 1989.

Characteristic data patterns such as these include component bit patterns, some of which are common among several characteristic data patterns. For example, a starting delimiter bit pattern is a common component which begins many other characteristic data patterns such as a token, an ending delimiter abort (EDAB) and other communication messages in a token ring protocol. The occurrence of multiple bit patterns in a characteristic data pattern can be generalized by referring to a first component pattern which is immediately followed by a second component pattern for a first characteristic data pattern. A second characteristic data pattern can employ the same first component pattern which will then immediately be followed by a third component pattern which is different from the second component pattern.

In protocols having two characteristic data patterns with some of the component bit patterns being the same, the objective of pattern detection will be to detect either one of the two characteristic data patterns. In accordance with the adaptive active monitoring invention, the predecessor finite state machine will have a plurality of successor finite state machines which run simultaneously and parallel. The predecessor finite state machine will send a starting signal to both of the successor finite state machines, when the predecessor finite state machine has successfully detected the first component data pattern. The starting signal initializes both of the successor finite state machines to take over the analysis of the bit stream which follows the first component pattern, in order to look for the second component bit pattern or alternately the third component bit pattern. Both successor finite state machines run simultaneously and parallel and are mutually independent. They both run until one of them fails or one of them succeeds in finding its designated component bit pattern. In this manner, the speed of detection of a characteristic data pattern is increased, the number of components of the finite state machine array is decreased, and the effective real time control can be achieved for high speed data networks.

Turning now to FIG. 1A, a parallel finite state machine adaptive monitor 100 is shown. The bit stream 124 which comes from the communications network, is commonly connected to the input of all of the finite state machines FSM 130(J), 130(O), 130(H), 130(N), 130(I), 130(M), 130(E) and 130(B). The starting signal 202 applied to a finite state machine for example FSM 130(J), comes from the termination signal 208 generated by another finite state machine in the array 100. For example, the finite state machine FSM 130(O) has its start signal 202(O) derived from the starting signal 202(0) output by the finite state machine 130(J). The interconnection of the output termination signal 208 of a predecessor finite state machine, to the starting signal input 202 of a successor finite state machine, is accomplished by the programmable cross point switch 210 shown in FIG. 1A. The cross point switch 210 is configured to interconnect the starting signal input of a successor finite state machine to the termination signal output of the predecessor finite state machine, in order to accomplish a desired sequential analysis of component bit patterns making up consecutive portions of a data pattern of interest.

Also included in the adaptive monitor 100 of FIG. 1A, is a global reset signal 204 which is applied to the first occurring finite state machine connected to the bit stream 124. As will be seen in the discussion of FIG. 1E, the first finite state machine will be FSM(F). Also shown in FIG. 1A, is the first FSM 206 designation. Once again, this designation will be applied to one of the plurality of the finite state machines in the array, designating it as the first connected finite state machine to the bit stream being analyzed. The significance of being the first finite state machine is that no starting signal is applied to it. Instead, the first finite state machine connected to a data stream, continuously analyzes the bits in that data stream. All successor finite state machines to the first, predecessor finite state machine, require input starting signals to initiate their respective analyses of the bit stream 124.

FIG. 1A also shows the pattern alarms 144, 144' and 144" which result from the satisfactory completion of the analysis of a corresponding characteristic data pattern. The finite state machines FSM 130(J) through FSM 130(B) in FIG. 1A, can be each embodied as a large scale integrated circuit (LSI) chip, connected by means of a bus for conducting the start signals 202 and the termination signals 208 with the programmable cross point switch 210. The programmable cross point switch 210 can also be a separate LSI circuit chip. In another embodiment of the invention, the finite state machines FSM 130(J) through 130(B) and the programmable cross point switch 210, can collectively be integrated into a very large integrated circuit VLSI circuit chip.

Figures 1, 1A, 2:
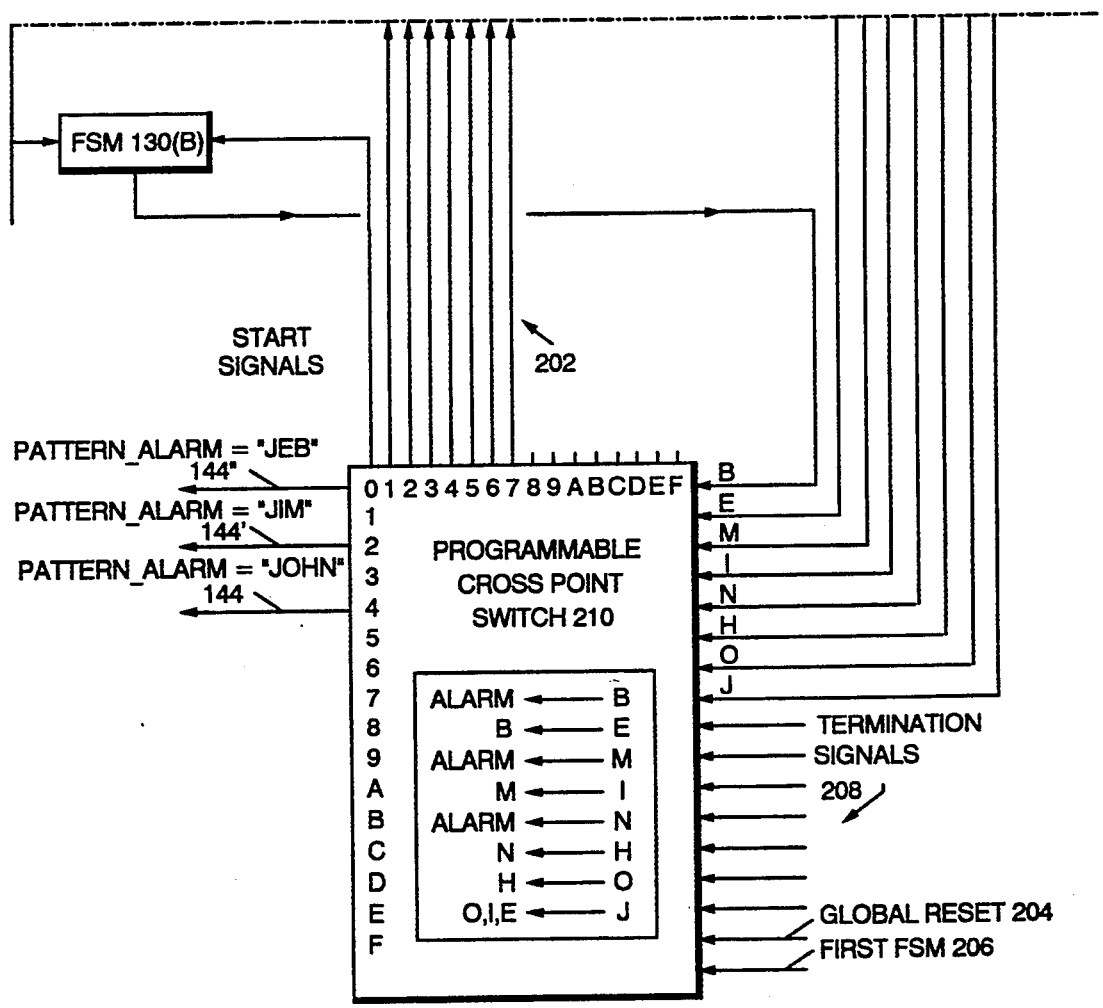
FIG. 2 illustrates an example of an array of finite state machines including a predecessor finite state machine 130(J) which starts a plurality of successor finite state machines, in parallel.
Figures 1, 1B:
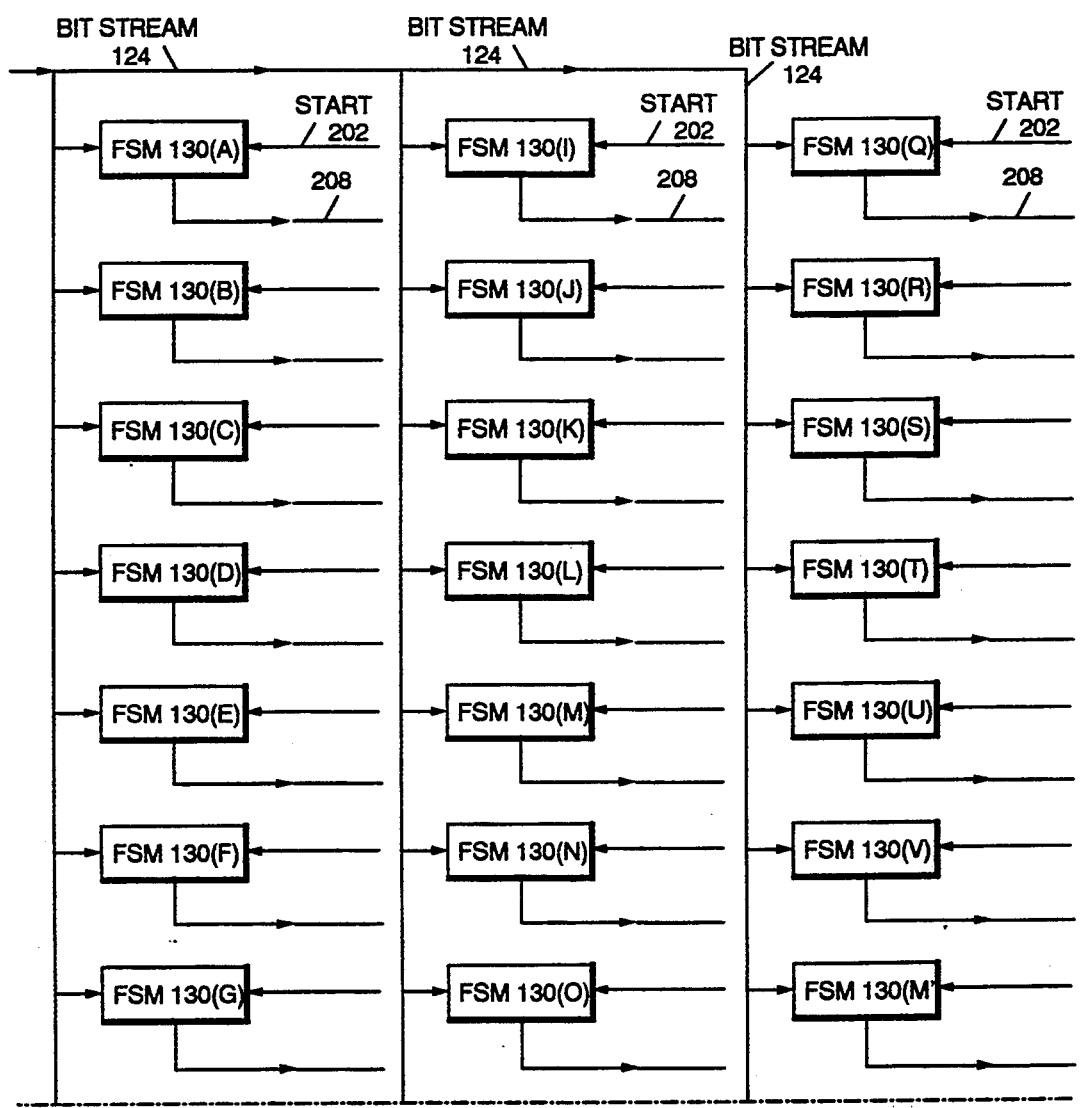
FIG. 1B is a functional block diagram showing a plurality of finite state machines that can be interconnected by means of a cross point switch.
Figures 1, 1B, 2:
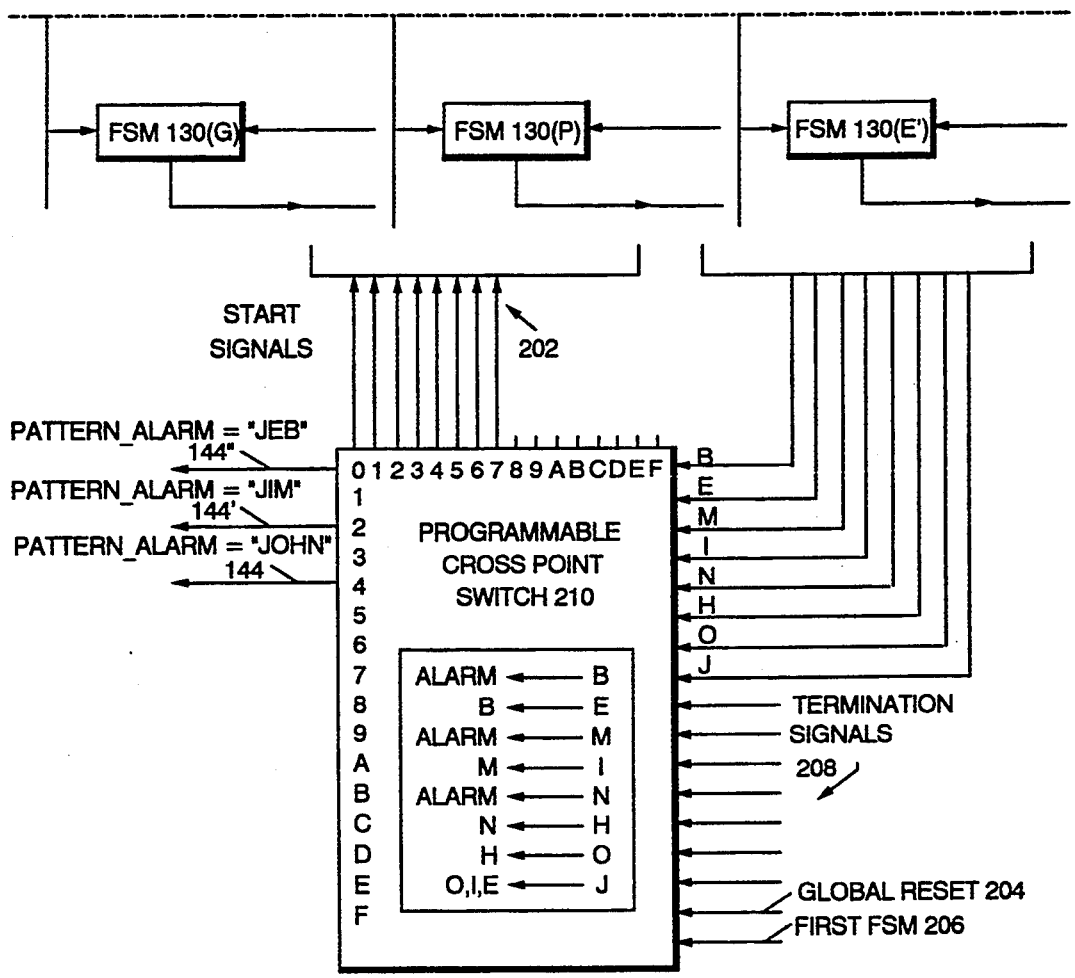

FIG. 1B shows another embodiment of the finite state machine array 100 shown in FIG. 1A, wherein it provides for a large array of selectively interconnectable finite state machines. In FIG. 1B, the programmable cross point switch 210 can selectively interconnect the termination signals from predecessor finite state machines to the start signal inputs 202 of successor finite state machines in a flexible, programmable manner. By configuring the interconnection pattern in the cross point switch 210, predecessor finite state machines may be selected for applying starting signals to successor finite state machines. A particular pattern of interconnection is shown in FIG. 1E and another particular pattern is shown in FIG. 1F. The embodiment shown in FIG. 1B can also be implemented as a plurality of LSI circuit chips or alternately all of the elements shown in FIG. 1B can be integrated onto the same very large scale integrated circuit chip.

Figure 1C:
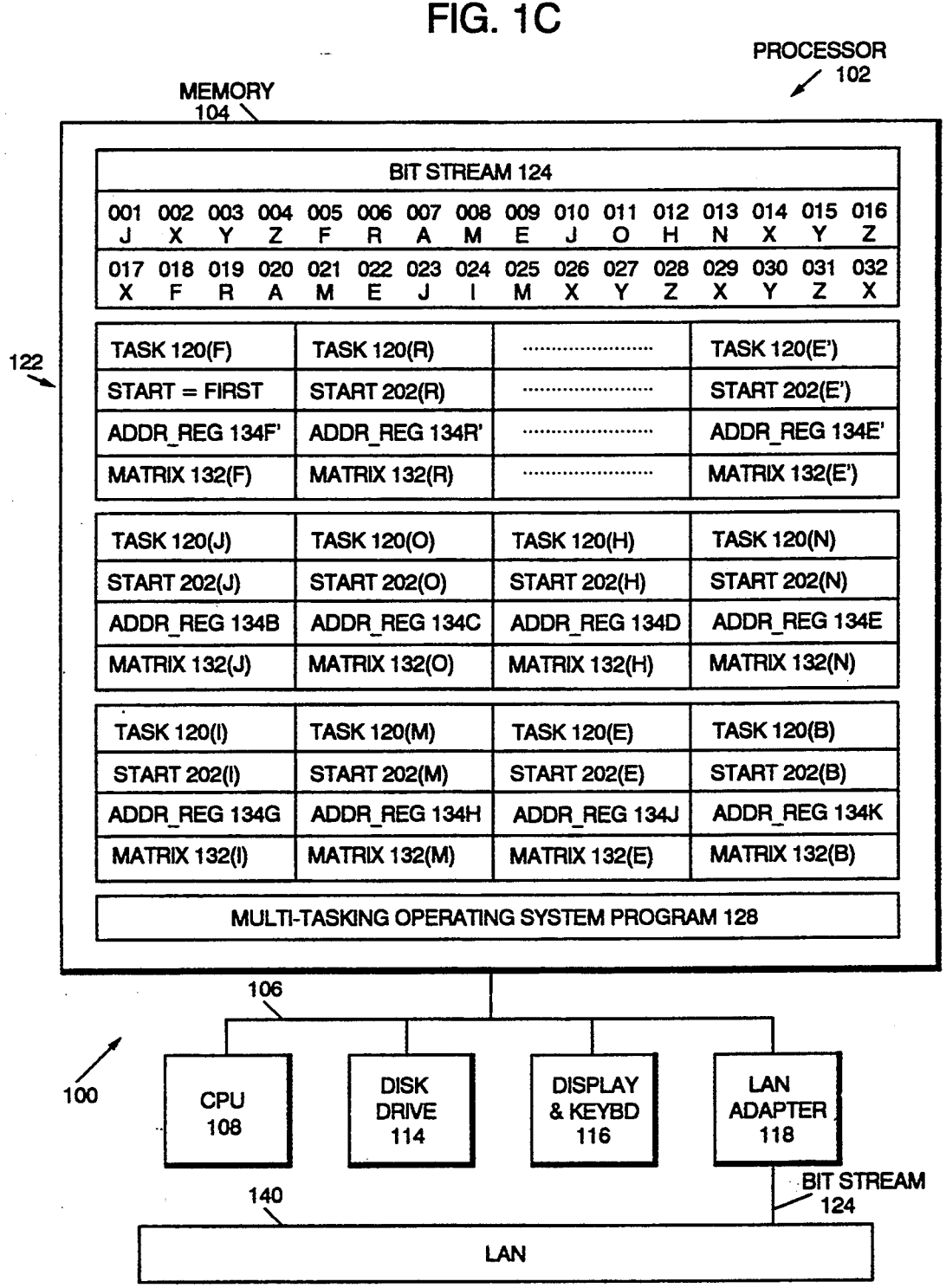
FIG. 1C illustrates a processor implementation of the invention wherein a plurality of finite state machines are embodied.

FIG. 1C shows a data processor implementation of the adaptive, active monitoring invention. FIG. 1C shows the processor 102 which includes the memory 104 connected by means of the bus 106 to the CPU 108, the disk drive 114, the display and keyboard 116 and the LAN adaptor 118. The LAN adaptor 118 is connected by means of the bit stream 124 to the local area network 140.

The memory 104 includes a bit stream partition 124, and a plurality of task partitions 120F, 120(R), 120(E'), 120(J), 120(O), 120(H), 120(N), 120(I), 120(M), 120(E) and 120(B). Each task partition, such as task partition 120(F) includes a start partition 202, an address register partition 134, and a matrix partition 132. For example, task 120(F) includes the address register 134F' and the matrix 132(F). In order to designate a first FSM, the start partition 122 for the task 120(F) stores the designation "FIRST." The memory 104 also includes a multitasking operation system program 128. In accordance with the invention, each task 120(F), 120(R), 120(E'), 120(J), 120(K), etc., will be executed in parallel in a multi-tasking mode. Each task will have applied to it the current bit from the bit stream 124. The respective task 120 will operate in the same manner as the finite state machines 130(J), 130(O), 130(H), 130(N), 130(I), 130(M), 130(E), 130(B), for example in FIG. 1A. The task 120 in FIG. 1C will pass starting signals from a predecessor finite state machine operating in a first task, for example task (F) to a successor finite state machine operating in a next task, for example task 120(R).

In accordance with the invention, the task 120(J) will issue a starting signal upon satisfactory termination of its matrix 132(J), to three parallel tasks, task 120(O), 120(I), and 120(E). This will launch simultaneous, independent, parallel operation of the tasks 120(O), 120(I) and 120(E) as three parallel successor tasks to the task 120(J).

Figure 1D:
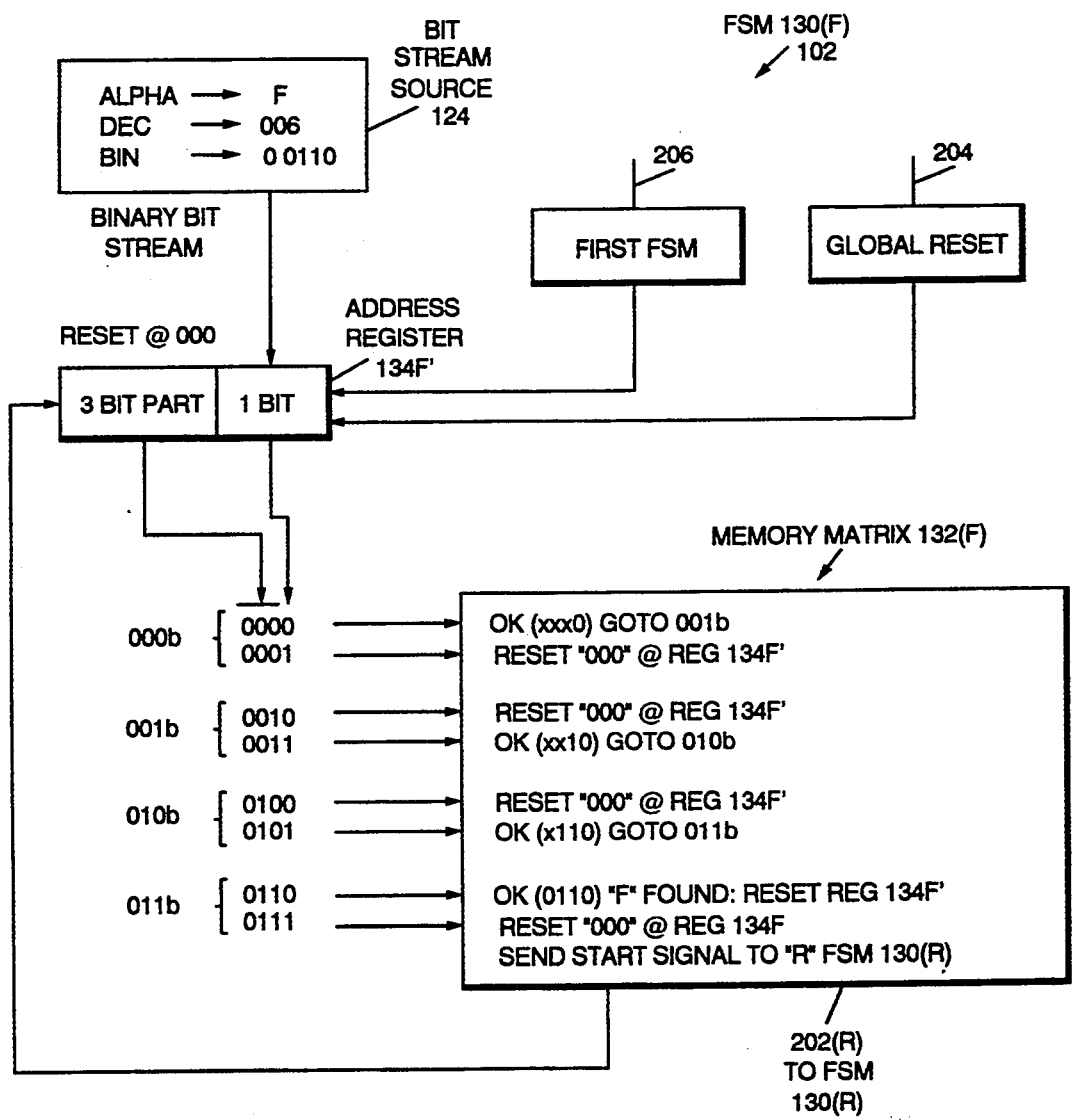
FIG. 1D illustrate a first finite state machine serving as the first patterns analysis stage in a plurality of finite state machines.
Figure 1E:
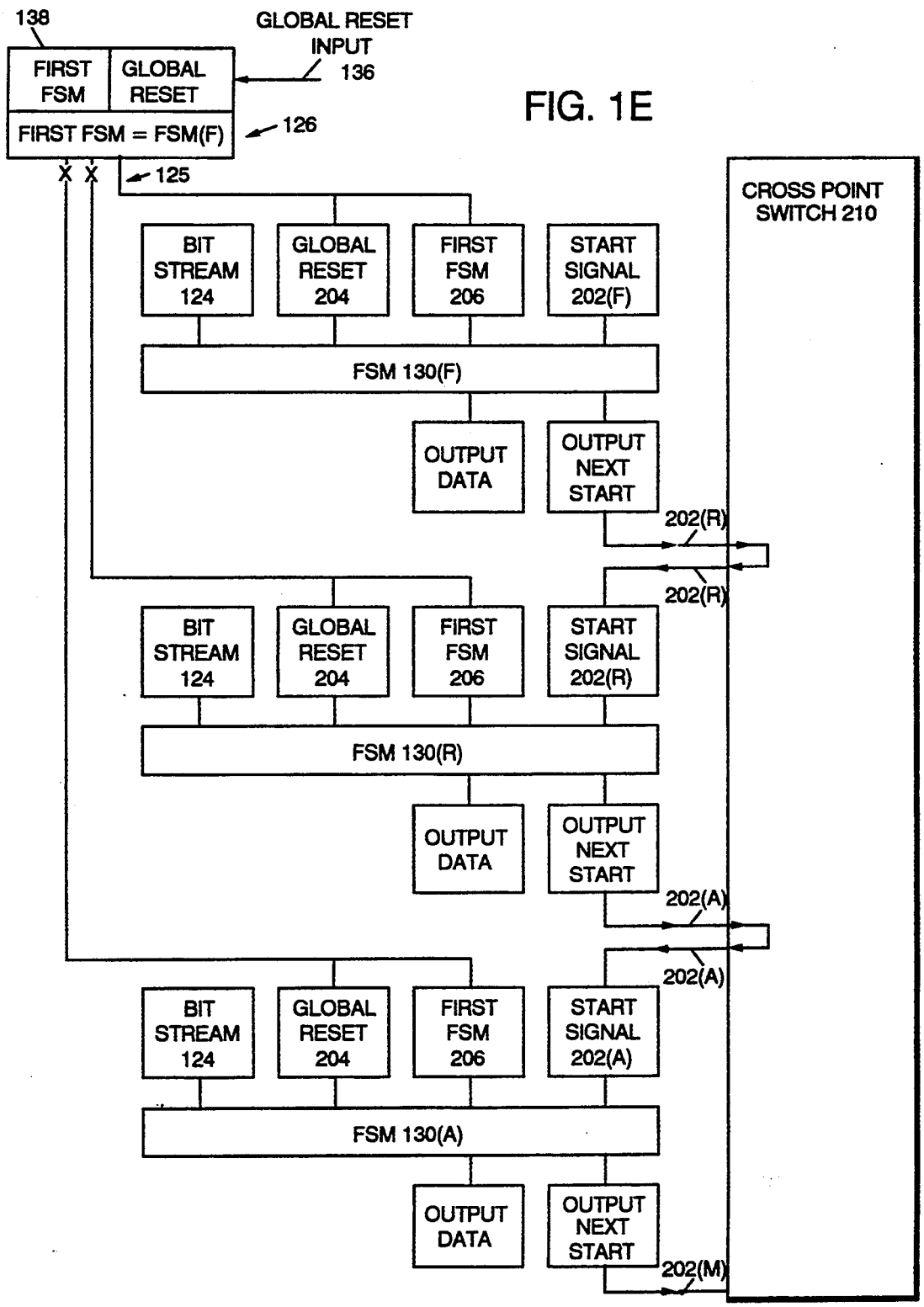
FIG. 1E illustrate the interconnection of a first finite state machine with successor finite state machines, using a cross point switch.
Figure 1F:
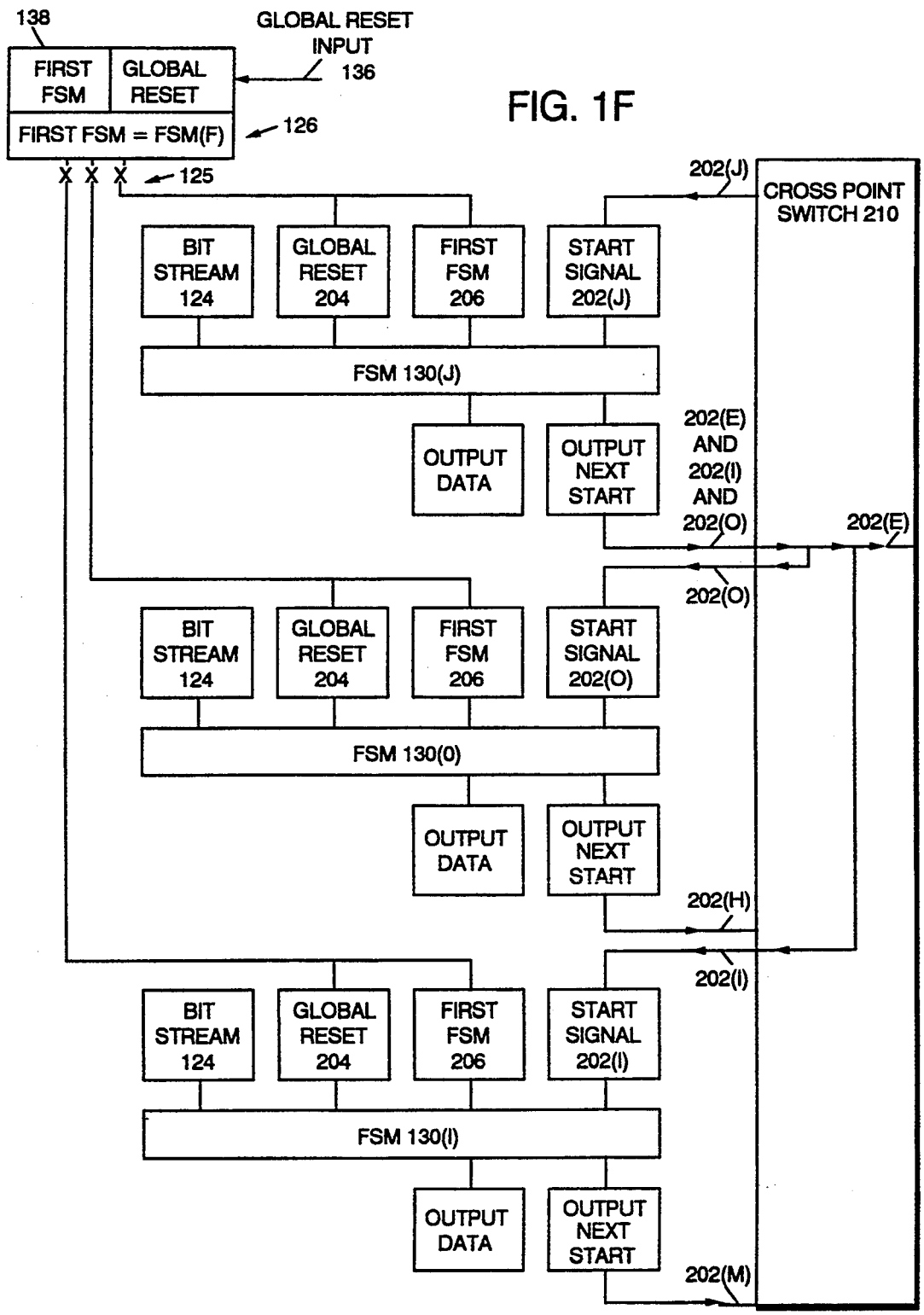
FIG. 1F illustrates the interconnection of a predecessor finite state machine and a plurality of successor, parallel finite state machines using a cross point switch.
Figure 2:
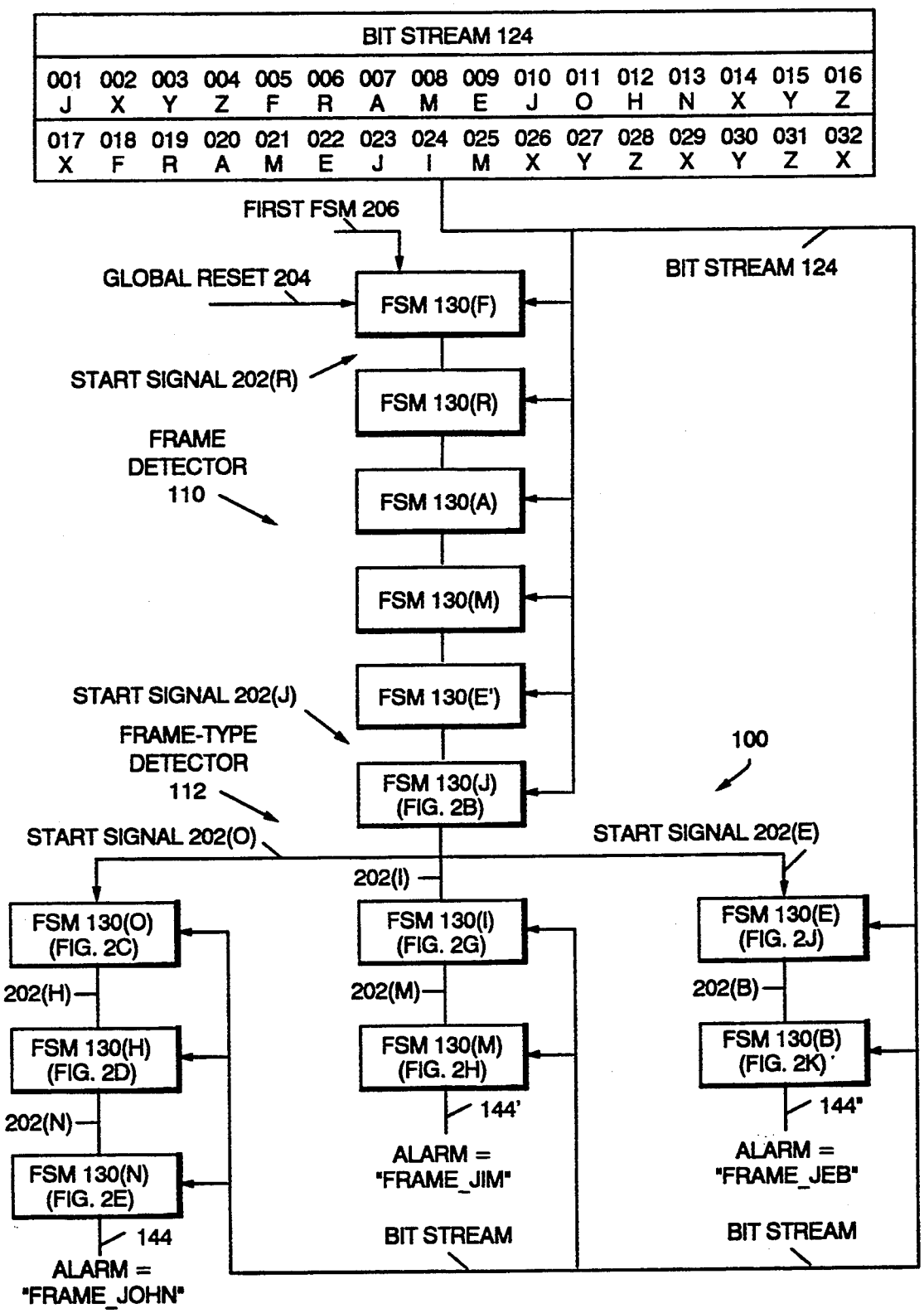

FIG. 1D illustrates the finite state machine FSM 130(F), which is the first finite state machine connected to the bit stream 124. This can be more clearly seen with reference to FIG. 1E. Referring to FIG. 1E, a standard, modular, finite state machine configuration is shown for the FSM 130(F), the FSM 130(R) and the FSM 130(A). Each modular, finite state machine 130 shown in FIG. 1E, includes a bit stream 124 input, a global reset 204 input, a first FSM 206 input, a start signal 202(F) input, an output data port and an output next start port. By interconnecting a plurality of modular, finite state machines FSM 130(F), 130(R), 130(A), etc. by using the cross point switch 210 in FIG. 1E, a desired interconnection of predecessor and successor finite state machines can be achieved. The register file 138 distributes the global reset input 204 and the first FSM 206 designation. The register 126 stores the identity of the first FSM in the array. For the example given in FIG. 1E, the first FSM is FSM(F). The register file 138 has a selectable output 125 which is controlled by the contents of the register 126, which stores the identity of the first FSM. The designation of first FSM and the global reset input 136 are connected over the output 125 to only one of the finite state machines, based upon the identity of the first FSM in register 126. The rest of the finite state machines in the array are not connected to the global reset input 136 and they do not have the designation as "first FSM." In the example shown in FIG. 1E, the FSM 130(F) is designated as the first FSM and it receives the global reset signal from input 136. The corresponding connections from the register file 138 to the rest of the finite state machines in the array are disabled, in response to the designation in register 126. This prevents a global reset input 204 and a first FSM input 206 from being applied to the FSMs 130(R) and 130(A) in FIG. 1E. Note also that there is no starting signal 202(F) applied to the first FSM 130(F). Starting signals are only applied to successor finite state machines in the array. Thus, the first finite state machine FSM 130(F) continuously analyzes the input bit stream 124, without the necessity of being restarted with a start signal.

It is seen that in FIG. 1E, the output next start signal 202(R) from the first FSM 130(F) is connected by means of the cross point switch 210, to the start signal input of the second FSM 130(R). Similarly, the output next start signal 202(A) from the FSM 130(R) is input to the start signal input 202(A) of the FSM 130(A), by means of the cross point switch 210. The cross point switch 210 is able to selectively reconfigure the interconnection of the finite state machines in the array shown in FIG. 1B. It is seen in FIG. 1E that the register 126 selectively designates one of the finite state machines in the array of FIG. 1B as the first finite state machine. In the example shown in FIG. 1E, the first finite state machine is designated as FSM(F). That first finite state machine will receive the global reset 204 and the first FSM designation 206.

FIG. 1F continues the illustration, showing a significant feature of the invention. The finite state machine FSM 130(J) has an output next start signal which consists of three starting signals, 202(E), 202(I), and 202(O). They respectively start the FSM 130(E), FSM 130(I) and FSM 130(O). This is accomplished by the selective configuration of the cross point switch 210 in FIG. 1F. It is seen that the register 126 continues to designate the FSM(F) of FIG. 1E, as the first FSM. Therefore, no global reset or first FSM designation is given to FSM 130(J), FSM 130(O) or FSM 130(I) of FIG. 1F. Thus, it is the start signal 202(J) which starts the analysis of FSM 130(J) of the bit stream 124. Similarly, it is the start signal 202(O) which starts the analysis by FSM 130(O) of the bit stream 124. Similarly, it is the start signal 202(I) which starts the analysis by FSM 130(I) of the bit stream 124.

Turning now to FIG. 2, it is seen how the finite state machine array is interconnected to perform three parallel data pattern analyses in the bit stream 124. The frame detector 110 consists of the FSM 130(F), 130(R), 130(A), 130(M) and 130(E'). These finite state machines look for the consecutive characters "F", "R", "A", "M" and "E" in the bit stream 124. If they are found, then the start signal 202(J) is passed from the FSM 130(E') to the FSM 130(J).

The frame type detector 112, which consists of the FSM 130(J), 130(O), 130(H), 130(N), 130(I), 130(M), 130(E) and 130(B), performs frame type detection for three frame type character patterns in the bit stream 124, which can immediately follow the "FRAME" frame designation in the bit stream 124. In accordance with the invention, the FSM 130(J) outputs three starting signals, 202(O), 202(I), and 202(E), to start three parallel, simultaneous, independently operating finite state machine sequences shown in FIG. 2. In the example shown in FIG. 2, the frame detector 110 searches for the character pattern "FRAME." If that pattern is found in the bit stream of 124, then the FSM 130(J) starts the three parallel simultaneous sequences which look for the character pattern "JOHN", or "JIM", or "JEB". The output alarm "FRAME_JOHN", is output from the FSM 130(N) if that character pattern is identified. The output alarm "FRAME_JIM", is output from the FSM 130(M), if that character pattern "JIM", is found in the bit stream 124. The output alarm "FRAME_JEB", is output from FSM 130(B), if "JEB" is found in the bit stream 124. Each of these frame type character patterns must follow the first pattern of "FRAME".

Figure 3:
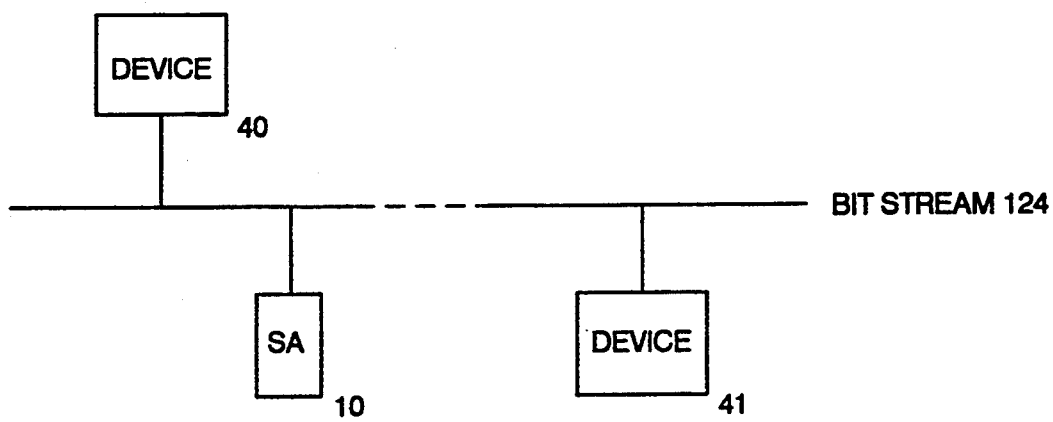
FIG. 3 illustrates a security agent (SA) 10 and communicating devices 40 and 41 connected to a bit stream 124.

FIG. 3 illustrates a security agent (SA) 10 and communicating devices 40 and 41 connected to a bit stream 124. SA 10 monitors bit stream 124 searching for characteristic patterns in data transmitted between communicating devices 40 and 41. In response to a detected characteristic pattern, SA 10 modifies, injects, or deletes information in bit stream 124. For example, SA 10 can produce and transmit a security alert message to one or both of the communicating devices 40 and 41 or to some other device such as a network security manager not shown in FIG. 3. The SA 10 can also send a response message to one of the communicating devices 40 and 41 or to some other device such as a network security manager via a different communication path not shown in FIG. 3. Those skilled in the art will recognize that many possible paths may exist for the SA 10 to transmit responses to other devices or to take some action in response to a detected characteristic pattern by modifying, injecting, or deleting information in bit stream 124.

Figure 4:
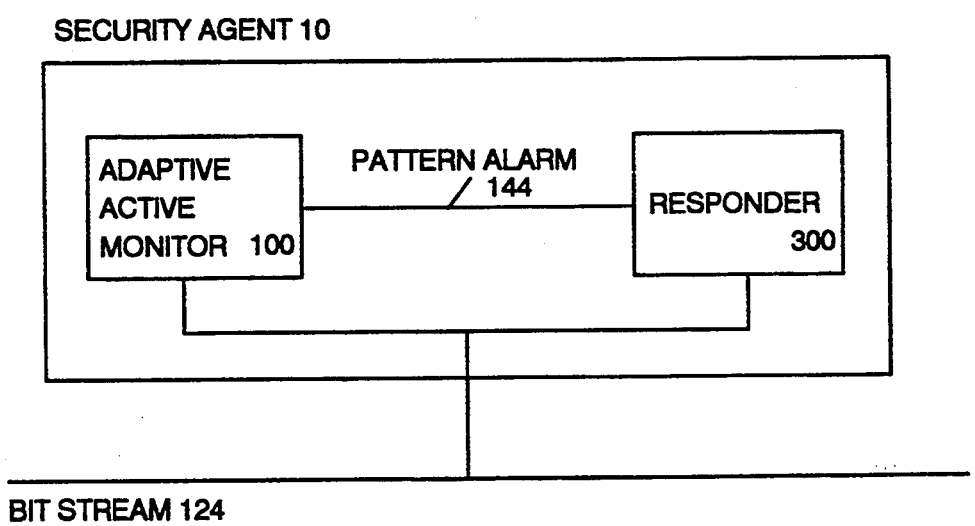
FIG. 4 illustrates a security agent (SA) 10 connected to a bit stream 124 consisting of an adaptive, active monitor 100 and a responder 300.

FIG. 4 illustrates a security agent (SA) 10 connected to a bit stream 124 consisting of an adaptive, active monitor 100 and a responder 300. Adaptive, active monitor 100 detects characteristic data patterns in bit stream 124 which, in turn, causes a pattern alarm signal 144 to be output. Pattern alarm signal 144 activates responder 300, which in turn responds by modifying, injecting, or deleting information in bit stream 124. Further, in accordance with the invention, adaptive, active monitoring means 100 may be capable of detecting a plurality of characteristic patterns, in which case responder 300 is capable of modifying, injecting, and deleting information in bit stream 124 in a plurality of ways, depending on, and in response to said plurality of pattern alarm signals 144, 144', 144'' not shown in FIG. 4.

Figure 5:
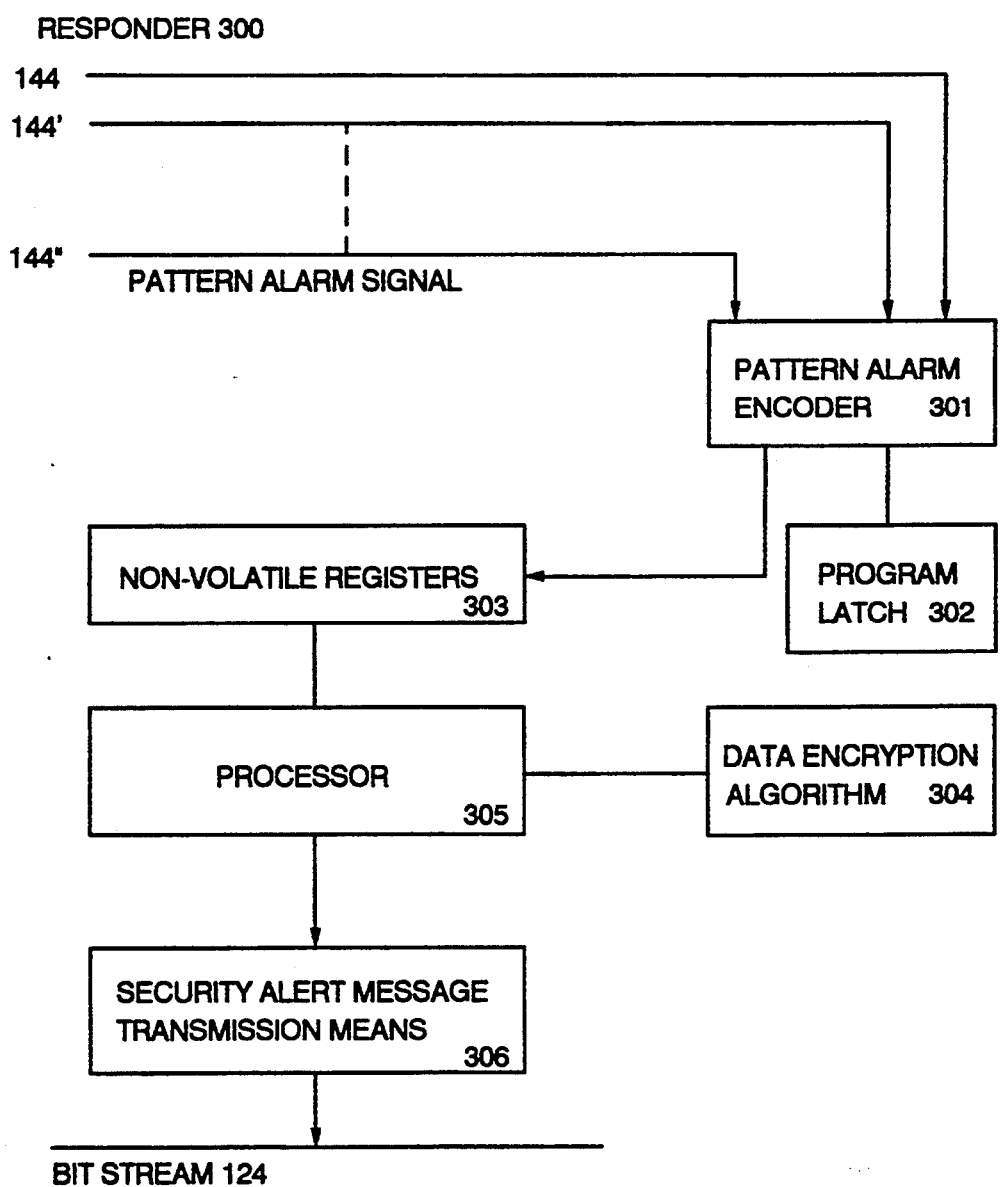
FIG. 5 is a block diagram of a responder 300.

Referring to FIG. 5, one of a plurality of pattern alarm signals (144, 144', ..., 144'') is encoded by pattern alarm encoder 301, whereupon the encoded output is stored in one of a plurality of non-volatile registers 303 and a program latch 302 is set. The program latch is used as a means to signal responder 300 to process the received pattern alarm signal. Non-volatile registers 303 contains a set of parameter values that collectively represent those values used to initialize or configure responder 300, such as (1) a security agent identifier which can be used to uniquely identify messages originated by the security agent, (2) an encoded pattern alarm signal identifying the current alarm signal to be processed by responder 300, a (3) sequence number counter that is incremented and transmitted in each message originated by the security agent, and (4) a secret cryptographic key used by the data encryption algorithm 304 to encrypt/decrypt messages. Data encryption algorithm 304 can be any of several cryptographic algorithms such as the Data Encryption Algorithm (DEA) described in American National Standard X3.92-1981, DATA ENCRYPTION ALGORITHM, American Standards Institute, New York (Dec. 31, 1981). Security alert message transmission means 306 performs the function of transmitting a constructed security alert message over bit stream 124 using a defined protocol and access method. For example, the constructed security alert message can be inserted into bit stream 124, In a token ring, the security alert message transmission means 306 can consist of software and hardware components permitting the transmission of a "unit" of data on the token ring network. On the other hand, security alert message transmission means 306 can transmit a security alert message by intercepting and modifying data within an existing data structure transmitted over bit stream 124. Upon detecting that program latch 302 has been set (e.g., by polling program latch 302 during periods when processor 305 is inactive), processor 305 constructs a security alert message from information stored in non-volatile registers 303 and causes a message authentication code to be calculated on the security alert message by invoking data encryption algorithm 304, passing the so-produced security alert message and message authentication code to security alert message transmission means 306. Security alert message transmission means 306 causes the security alert message and message authentication code to be transmitted via bit stream 124 to a destination device such as a network security manager device.

Processor 305 can consist of a microprocessor, microcode maintained in a read only memory (ROM), and a random access memory (RAM) for storage of intermediate results. In like manner, processor 305 can consist of a collection of parallel and serial finite state machines similar to the Hershey adaptive, active monitor 100. However, microprocessor-ROM-RAM implementation can be most advantageous since unlike the adaptive, active monitor 100, responder 300 is likely to be required to process pattern alarm signals only occasionally in response to detected security events. That is, security events are likely to arrive only after relatively long periods of delay. Thus, an implementation based on parallel FSMs can best be characterized as "overkill" with respect to responder 300.

Figure 6:
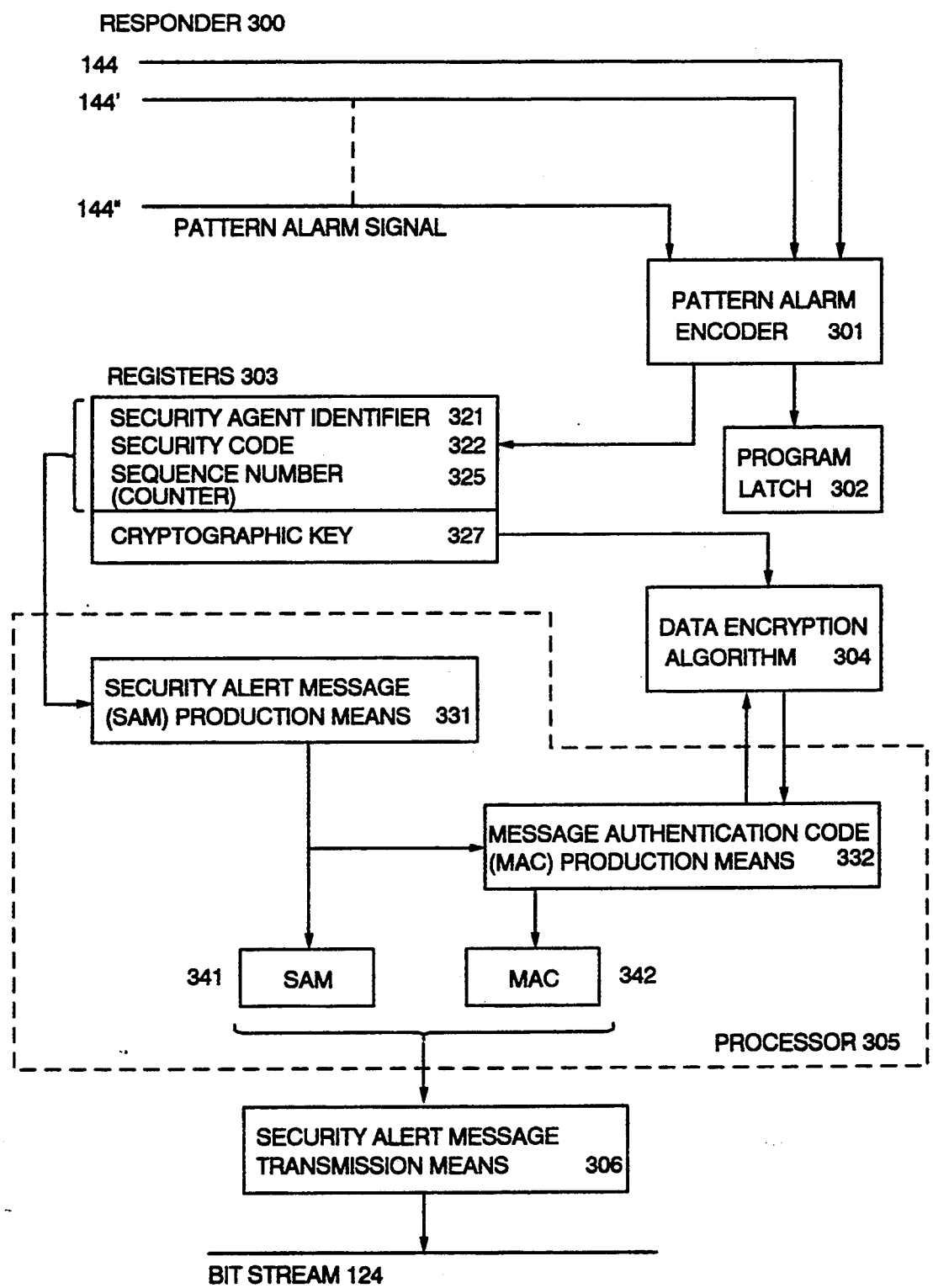
FIG. 6 is a block diagram illustration of the Responder 300 that processes security events, which are characterized as one of a plurality of possible pattern alarms (144, 144', ..., 144") output by Adaptive, Active Monitor 100 of FIG. 4.

FIG. 6 is a block diagram illustration of a Responder 300 that processes security events, which are characterized as one of a plurality of possible pattern alarms (144, 144', ..., 144'') output by the Adaptive, Active Monitor 100 of FIG. 4. FIG. 6 is a further elaboration of FIG. 5 wherein nonvolatile registers 303 consist of a security agent identifier 321, a security code 322, a sequence number counter 323, and a cryptographic key 325 and processor 305 consists of a security alert message (SAM) production means 331, a message authentication code (MAC) production means 332, and storage for a so-produced security alert message (SAM) 341 and a so-produced message authentication code (MAC) 342.

Referring to FIG. 6, one of a plurality of pattern alarm signals (144, 144', ..., 144'') is encoded by pattern alarm encoder 301, whereupon the encoded output is stored in one of a plurality of non-volatile registers 303 and a program latch 302 is set. Upon detecting that program latch 302 has been set (e.g., by polling program latch 302 during periods when processor 305 is inactive), processor 305 performs the following steps. Sequence number counter 325 is incremented and security agent identifier 321, security code 322, and sequence number counter 325 are read from non-volatile registers 303 and processed by security alert message (SAM) production means 331 to produce an output security alert message 341. SAM 341 is next passed to message authentication code (MAC) production means 332 to produce a message authentication code (MAC) 342. In order for Message authentication code (MAC) production means 332 to produce MAC 342, SAM 341 and cryptographic key 327, which is retrieved from non-volatile registers 303, are passed as inputs to data encryption algorithm 304 which performs the individual steps of encryption in order to produce MAC 342. The so-produced SAM 341 and MAC 342 are the provided to security alert message transmission means 306 which causes SAM 341 and MAC 342 to be transmitted via bit stream 124 to a network security manager device.

FIG. 7 depicts a security alert message 341 consisting of a security agent identifier 321, a security code 322 and a sequence number counter 325. Further in accordance with the invention, security code 322 consists of a CATEGORY 323 which provides a broad characterization of the detected pattern alarm and a TYPE 324 which specifies a particular pattern alarm within category 323. For example, the security alert message can define categories such as these (1) virus, (2) inappropriate word usage, (3) intrusion, and (4) non-encrypted text. For CATEGORY = virus, TYPE can be defined as (1) Christmas EXEC, (2) ..., and so forth. Those skilled in the art will recognize (1) there are many ways in which security events can be divided into categories and types and (2) said invention is independent of the categories and types which are selected.

A security agent identifier 321 is included in security alert message 341 so that the messages' receiver will have proof of the identity of the security agent who has detected a pattern alarm and originated the security alert message. A sequence number counter 325 is included in security alert message 341 so that an adversary, who may intercept and replay security alert message 341 in bit stream 124, will be unable to cause the designated receiver to accept the security alert message as genuine. In an alternate embodiment of the invention, a time stamp can be used in place of sequence number counter 325 to prevent message replay attacks.

U.S. Pat. No. 4,918,728 entitled "Data Cryptography Operations Using Control Vectors", cited above under Related Patents and Patent Applications, describes a method for generating message authentication codes using the Data Encryption Algorithm (DEA) and a secret cryptographic key. The method is also described in American National Standard (ANSI) X9.9-1986 Financial Institution Message Authentication (Wholesale). The MAC is a 32-bit cryptographic checksum which cannot be calculated without knowledge of the secret cryptographic key. Thus, cryptographic key 327 must be shared by security agent 10 and the designated receiver (e.g., a network security manager). To verify a MAC, the receiver calculates a MAC-of-reference using his copy of the cryptographic key 327 and his copy of the Data Encryption Algorithm 304 using a comparable message authentication code production means 332 (see FIG. 6). If the received MAC and the calculated MAC-of-reference are equal, the received security alert message is accepted as genuine. Otherwise, if the received MAC and the calculated MAC-of-reference are unequal, the received security alert message is rejected. In effect, the integrity of transmitted security alert messages is assured through the use of the MAC. An adversary cannot change a single bit in the security alert message without causing a completely different, and unpredictable, MAC-of-reference to be generated by the receiver. Without the cryptographic key, it is impossible for an adversary to impersonate an authorized security agent.

In response to received security alert messages, the network security manager can take a number of possible actions. Management can be notified in situations where employees use systems resources for non-business purposes, use inappropriate language in E-mail messages, or violate copyright rules. Management, IS, or site security can be notified in situations where possible intrusion is suspected. A virus alert message can be broadcast to system users if a virus is detected. The network security manager may shut down portions of a system until system files can be scanned for a suspected virus.

Figure 8:
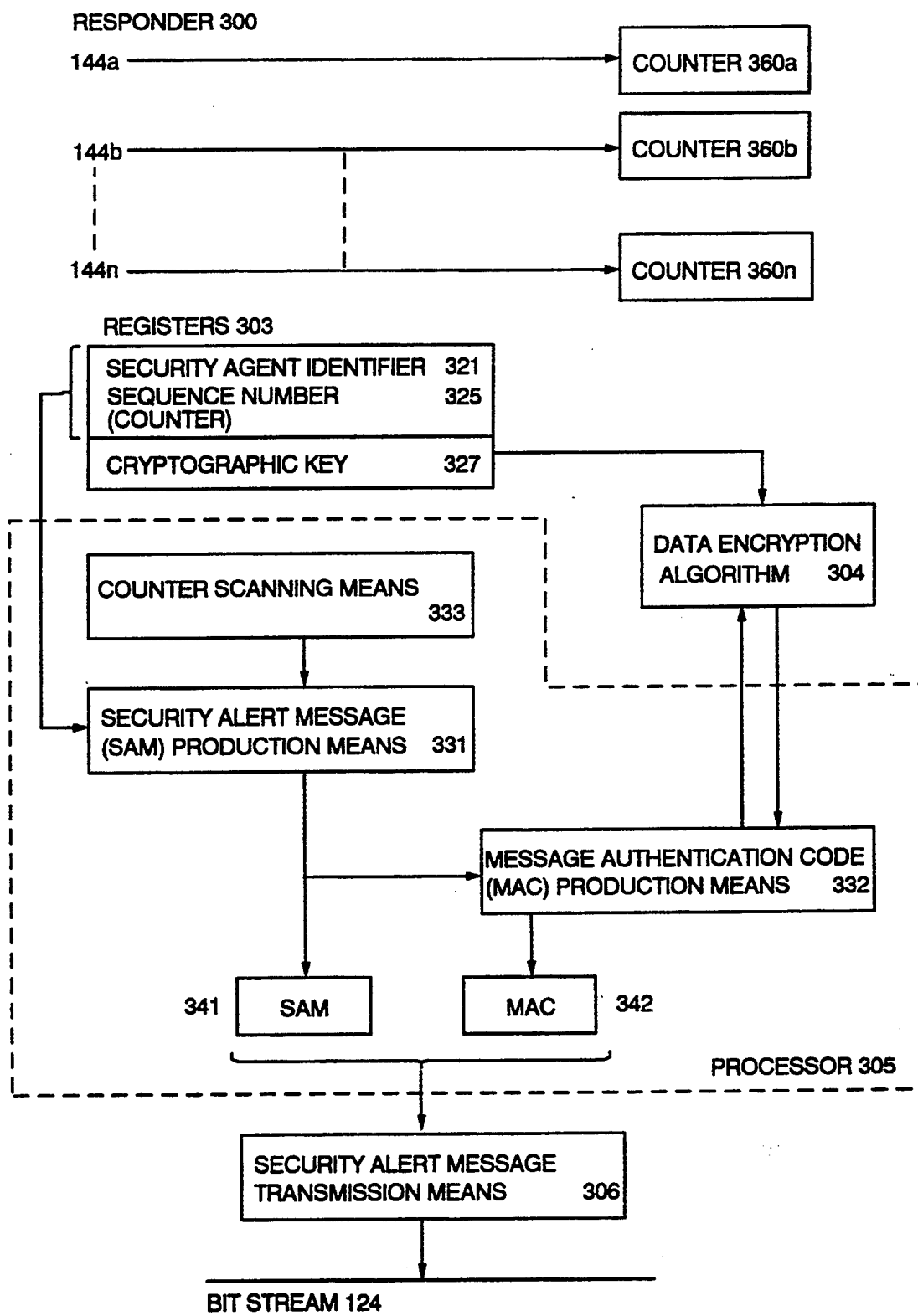
FIG. 8 is a block diagram illustration of an alternate embodiment of the invention (as described in FIG. 6) wherein the pattern alarms 144a, 144b, ..., 144n from the Hershey adaptive, active monitor 100 are applied to counters 360a, 360b, ..., 360n, respectively, in order to prevent adaptive, active monitor 100 (see FIG. 4) of FIG. 4 from over-running responder 300.

FIG. 8 is a block diagram illustration of an alternate embodiment of the invention (as described in FIG. 6) wherein the pattern alarms 144a, 144b, ..., 144n from the Hershey adaptive, active monitor 100 are applied to counters 360a, 360b, ..., 360n, respectively, in order to prevent adaptive, active monitor 100 of FIG. 4 from over-running responder 300. The sizes of counters 360a, 360b, ..., 360n are set so that the number of pattern alarm signals does not cause a counter overflow during the interval of time in which a security alert message is produced and transmitted. For example, 32-bit counters are more than adequate to prevent counters from overflowing.

Referring now to FIG. 8, each pattern alarm signal 144i causes its associated counter 144i to be incremented by value +1, so that each counter records the numbers of respective pattern alarm signals produced by adaptive, active monitor 100. Processor 305 contains three processing functions, as follows: (1) counter scanning means 333, (2) security alert message production means 331, and (3) message authentication code production means 332. Counter scanning means 333 continually scans the counters, 360a, 360b, etc., searching for a non-zero counter value. When the final counter 360n is reached, the scanning continues with counter 360a, and so forth. When a non-zero counter value is detected, the counter value is read out and a security alert message and message authentication code are produced and transmitted. It is assumed that the process of reading out a counter value causes the counter to be reset to zero. In this way, the counter can continue to be updated during the time interval when a security alert message and message authentication code are produced and transmitted. Afterwards, counter scanning means 333 continues searching for a non-zero counter value—starting with the next counter in sequence following the counter that was just processed. Counter scanning means 333 also makes use of an index value representing the index of the counter currently being scanned. Upon detecting a non-zero counter value (via counter scanning means 333), processor 305 performs the following steps:

1. Sequence number counter 325 is incremented.
2. Security agent identifier 321 and sequence number counter 325 are read from nonvolatile registers 303.
3. The value in counter 360i, corresponding to index i (where i is the index of the current counter being scanned), is read.
4. Sequence number counter 325, security agent identifier 321, index i, and the value of counter 360i are passed to passed as inputs to security alert message production means 331.
5. The value of index i is then used as a means to access a corresponding security code. It is assumed that processor 305 contains a table of n predefined security codes corresponding to the n pattern alarm signals 144a, 144b, ..., 144n and to the n counters 360a, 360b, ..., 360n, respectively. Thus, each index value uniquely specifies a security code 322 consisting of a category 323 and a type 324.
6. Security alert message production means 331 produces a security alert message 341, conforming to the message format shown in FIG. 9, consisting of a security agent identifier 321, a security code 322, a sequence number counter 325, and a pattern alarm counter value 326 corresponding to the value in counter 360i.
7. SAM 341 is next passed to message authentication code (MAC) production means 332 to produce a message authentication code (MAC) 342. In order for Message authentication code (MAC) production means 332 to produce MAC 342, SAM 341 and cryptographic key 327, which is retrieved from nonvolatile registers 303, are passed as inputs to data encryption algorithm 304 which performs the individual steps of encryption in order to produce MAC 342.
8. The so-produced SAM 341 and MAC 342 are then provided to security alert message transmission means 306 which causes SAM 341 and MAC 342 to be transmitted via bit stream 124 to a network security manager device.

In yet another alternative embodiment of the invention (not shown in a figure), responder 300 can periodically read out all the counter values and form a single security alert message containing the counter values corresponding to each pattern alarm. In this case, responder 300 would require an internal clock, e.g., a counter that is incremented by 1 for each bit in bit stream 124 that is scanned by adaptive, active monitor 100 of FIG. 4. When the clock reaches a predetermined threshold value, processor 305 would gain control. Processor 305 would then read the counter values, produces a security alert message containing a vector of counter values and a message authentication code, and transmits the security alert message and message authentication code to the network security manager via bit stream 124.

FIG. 9 depicts an extended security alert message 341 consisting of a security agent identifier 321, a security code 322, a sequence number counter 325, and a pattern alarm counter value 326. The extended security alert message 341 of FIG. 9 differs from the security alert message 341 of FIG. 7 in that the extended security alert message 341 of FIG. 9 contains a pattern alarm counter value 326. Pattern alarm counter value 326 represents the number of pattern alarms (with security code 322) detected by security agent 10 of FIG. 4 (with security agent identifier 321). Extended security alert message 341 can also contain a time-stamp instead of a sequence number counter. This would have the added advantage that a network security manager who receives the security alert message can easily calculate a rate (number of occurrences per standard interval of time) at which the security events are occurring.

Those skilled in the art will recognize that the embodiment of FIG. 8 can be easily adapted to detect and respond to security events corresponding to so-called "dirty" words (4-letter words). In that case, a first "dirty" word is associated with pattern alarm 144a, a second "dirty" word is associated with pattern alarm 144b, and so forth. The security code 322 would consist of a category = "dirty words" and a type indicating the particular "dirty" word to be reported. The pattern alarm counter value 326 would specify the number of such words detected.

Those skilled in the art will also recognize that the embodiment of FIG. 8 can also be configured and adapted to detect use of computing resources for nonauthorized uses such a non-business purposes. This can be done by configuring the adaptive, active monitor to scan for words and phrases that are unlikely to be found in many business environments. For example, the words "Hymn sing", "Be my valentine", "How's the wife and kids" cannot commonly occur in ordinary business correspondence. Of course, in some environments these phrases can be perfectly legitimate. One would tailor the phrases to the particular business environment. One can as well scan for phrases commonly associated with copyright material, such as a warning notice embedded in copyright protected data. This can flag a possible copyright violation. One can also scan for company security designations in transmitted E-mail, such as "Confidential Restricted" which can demand the use of encryption. Therefore, the detection of the phrase "Confidential Restricted" can well signal a possible security violation.

Figure 10:
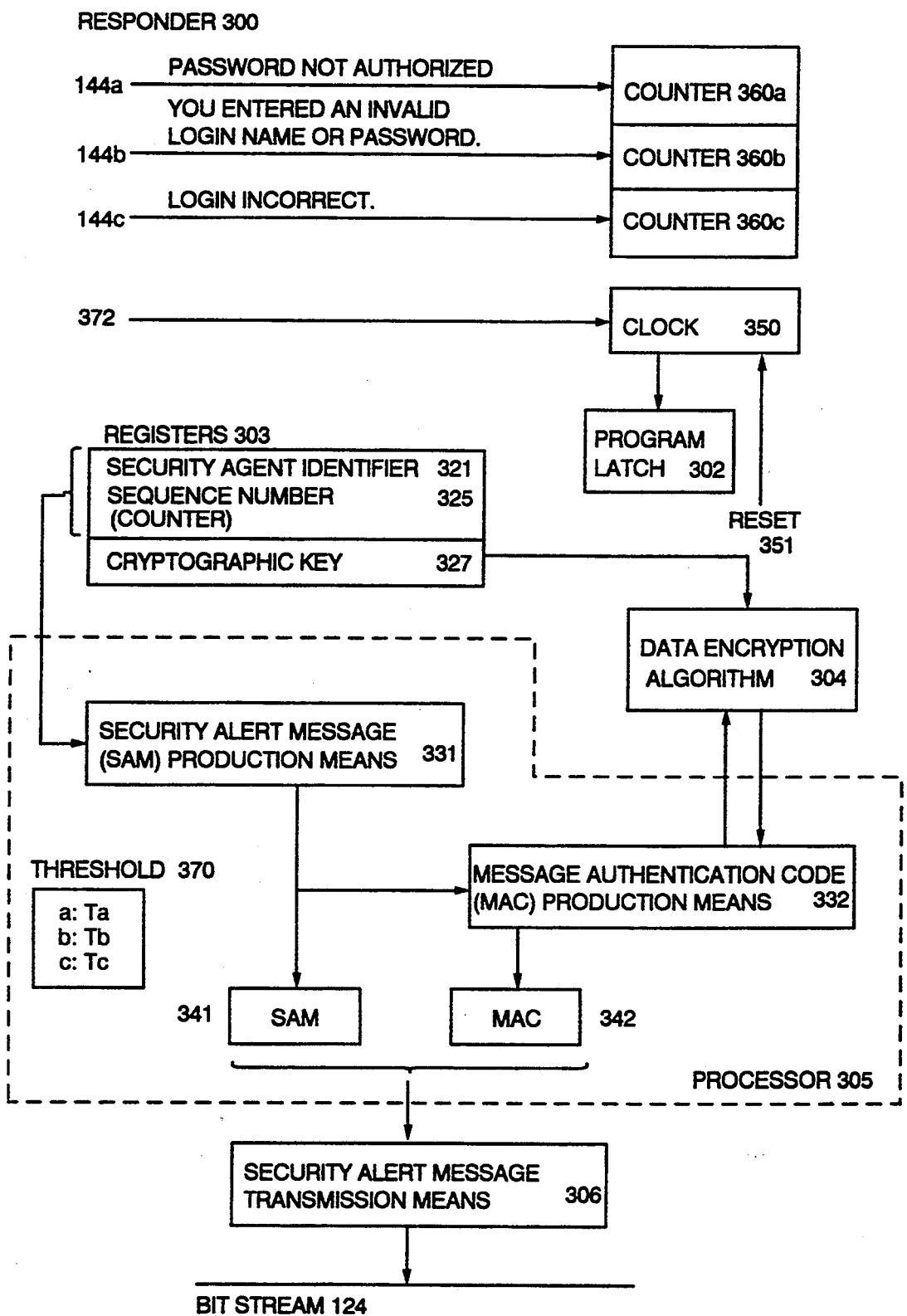
FIG. 10 is a block diagram illustration of another alternate embodiment of the invention wherein the Hershey adaptive, active monitor 100 of FIG. 4 is configured as an intrusion detector and responder 300 is designed to produce and transmit a security alert message whenever the number of detected pattern alarms of a particular type in a given interval of time reaches a prescribed threshold value.

FIG. 10 is a block diagram illustration of another alternate embodiment of the invention wherein the Hershey adaptive, active monitor 100 of FIG. 4 is configured as an intrusion detector and responder 300 is designed to produce and transmit a security alert message whenever the number of detected pattern alarms of a particular type in a given interval of time reaches a prescribed threshold value. Referring to FIG. 10, the Hershey adaptive, active monitor 100 of FIG. 4 is configured to scan bit stream 124 for three characteristic patterns, specified in double quotation marks:
1. "PASSWORD NOT AUTHORIZED"
2. "You entered an invalid login name or password."
3. "Login incorrect."

Each of these characteristic patterns represents a particular system response in an incorrect and invalid login. The phrase "PASSWORD NOT AUTHORIZED" (in Extended Binary Coded Decimal Interchange Code) is an IBM VM message provided to a host-attached workstation if the login sequence fails. The user VM login screen has the following prompts: "USERID ===V" and "PASSWORD ===>," specified in double quotation marks. These standard phrases can also be defined as characteristic patterns, except that in this case the Hershey adaptive, active monitor 100 would track both invalid as well as valid login requests. The phrase "You entered an invalid login name or password." is a standard response in UNIX to a failed login. In this case, the UNIX login screen has the following prompts: "login:" and "Password:". These standard phrases can also be defined as characteristic patterns. In IBM's version of TCP/IP File Transfer Protocol (FTP) for VM, the system prompts the user with the following: "USER (identify yourself to the host):". In the event of a failed login, the phrase "Login incorrect." is displayed to the user. Thus, the characteristic patterns specified in FIG. 10 will detect failed login attempts for (1) VM, (2) UNIX, and (3) TCP/IP FTP for VM. The reader will appreciate that similar characteristic patterns can be specified for other operating systems and systems applications requiring user login. Referring again to FIG. 10, the characteristic data "PASSWORD NOT AUTHORIZED" is associated with pattern alarm 144a, the characteristic data "You entered an invalid login name or password." is associated with pattern alarm 144b, and the characteristic data "Login incorrect." is associated with pattern alarm 144c. In like manner, pattern alarms 144a, 144b, and 144c are uniquely associated with counters 360a, 360b, and 360c, respectively. For example, counter 360a contains a value representing the number of pattern alarms 144a (corresponding to "PASSWORD NOT AUTHORIZED") received since said counter was last reset to zero. The counters themselves are assumed to be large enough so that they will not overrun. 32-bit counters would be sufficient to prevent such an overrun. In like manner, counter 360b contains a value representing the number of pattern alarms 144b (corresponding to "You entered an invalid login name or password.") received since said counter was last reset to zero and counter 360c contains a value representing the number of pattern alarms 144c (corresponding to "Login incorrect.") received since said counter was last reset to zero.

Responder 300 also contains a clock 350 which is attached to Hershey adaptive, active monitor 100 via line 372. Clock 350 is an incrementing counter. For each bit sampled in bit stream 124, a signal is sent via line 372 to clock 350, which causes the clock to increment by +1. When clock 350 reaches a predefined threshold value (e.g., the counter has a high-order one bit), program latch 302 is set. A clock size and threshold value are selected so that the time it takes to produce and transmit a security alert message is less than the time it takes clock 350 to cycle from zero to its threshold value. When processor 305 is not busy producing and transmitting a security alert message, processor 305 is busy monitoring program latch 302. When processor 305 detects that program latch 302 has been set, it reads the counter values (360a, 360b, and 360c), resets the counters to zero, and resets program latch 302. The counters are read and reset before the Hershey adaptive, active monitor is able to send another pattern alarm 144, thus preventing loss of information. Once the counters (360a, 360b, and 360c) have been read and reset, Hershey adaptive, active monitor continues, as before, sending pattern alarms (144a, 144b, and 144c). Processor 305 performs the following steps:

1. Each counter value is compared against a predefined threshold value stored in Threshold 370 (the value in counter 360a is compared against Ta in Threshold 370, the value in counter 360b is compared against Tb in Threshold 370 and the value in counter 360c is compared against Tc in Threshold 370).
2. If one or more of the counter values is greater than or equal to its corresponding threshold value (in Threshold 370), then security alert message production means 331 produces a security alert message 341 of the type shown in FIG. 7, containing (a) a security agent identifier 321, (b) a security code consisting of a category = "suspicious_login" and a type field signifying which of the counters reached its threshold, and (c) a sequence number counter 325. Otherwise, if no counter value has reached its threshold, then no security alert message 341 is produced and processor 305 again scans program latch 302 waiting for it to be set.
3. Message authentication code production means 332 now produces a MAC 342 on the so-produced security alert message 341.
4. Security Alert message transmission means 306 transmits SAM 341 and MAC 341 to the network security manager via bit stream 124.

Figure 11:
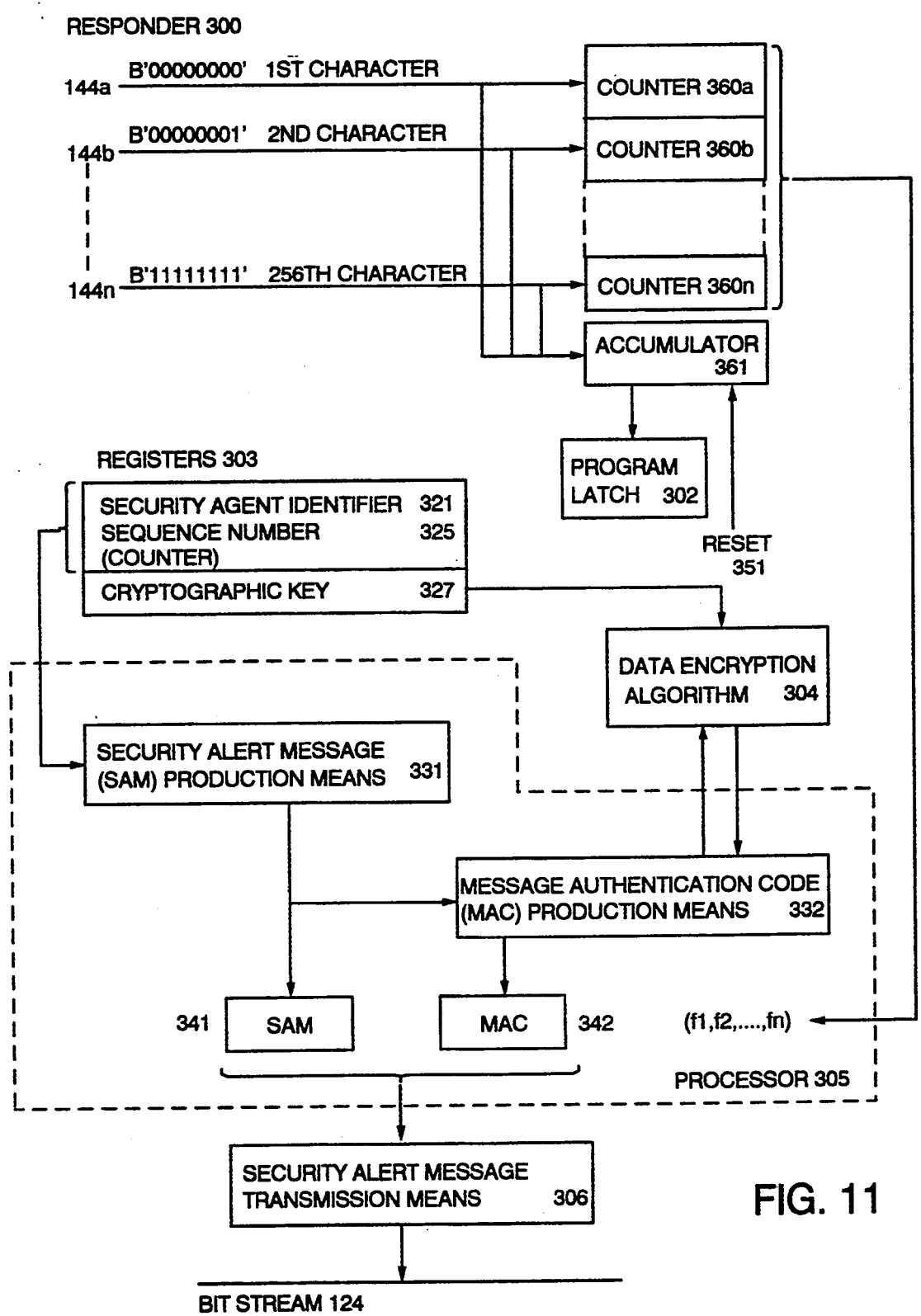
FIG. 11 is a block diagram illustration of another alternate embodiment of the invention wherein the Hershey, et al. adaptive, active monitor 100 of FIG. 4 is configured to detect the transmission of plain or clear text as opposed to ciphertext.

FIG. 11 is a block diagram illustration of another alternate embodiment of the invention wherein the Hershey adaptive, active monitor 100 of FIG. 4 is configured to detect the transmission of plain or clear text as opposed to ciphertext. In this security application, it is assumed that encryption is performed at the application layer (or layer 7 of the OSI stack) on the data portions of the transmitted messages. In this case, security agent 10 monitors a communications line to ensure that plaintext is not transmitted in situations where ciphertext is expected to be transmitted. However, there is a complicating factor that must also be addressed, namely that data compression techniques may be employed to compact the transmitted plaintext. Whereas, a relatively simple test can distinguish plaintext from ciphertext, such a test would most likely fail to distinguish compressed plaintext from ciphertext. So there are two cases that must be considered: (1) uncompressed plaintext is transmitted and (2) compressed plaintext is transmitted. We shall consider the first case, which accounts for a large part (and perhaps the largest part) of all text data transmitted in a network. Typically, Electronic Mail (or E-mail), which is a growing networking application, is uncompressed during transmission. Thus, if a link were supposed to carry only encrypted text and through an error or a failure the step was omitted, it would be likely that some uncompressed plaintext would be carried on the bit stream to be monitored-even if compression techniques were employed (e.g., to compress data files for storage and transmission). Thus, the description that follows assumes that compression is not used or is not used universally to compact all data transmitted in the bit stream 124.

The Hershey, adaptive active monitor 100 is configured to scan for each of the 256 possible 8-bit characters in the data portion of each transmitted frame. The Hershey adaptive active monitor 100 accomplishes this scanning for the starting and ending delimiters for each the data block and then scanning and recording each character within each data block. A method for accomplishing this is taught by Hershey and Waclawsky in copending U.S. patent application entitled "System and Method for Adaptive, Active Monitoring of a Serial Data Stream Having a Characteristic Pattern," Ser. No. 08/138,045 cited above under Related Patents and Patent Applications. Responder 300 is designed to produce and transmit a security alert message whenever the distribution of detected characters in a given interval of time "looks" more like plaintext than ciphertext, which is based on a statistical calculation.

Referring to FIG. 11, the Hershey, adaptive, active monitor 100 of FIG. 4 is configured to scan bit stream 124 for any of the 256 characters within the data portion of a transmitted frame. Pattern alarm 144a corresponds to the 1st character, designated B'00000000'; pattern alarm 144b corresponds to the 2nd character, designated B'00000001', ..., pattern alarm 144n corresponds to the 256th character, designated B'11111111'. For a given interval of time, counter 360a records the number of detected characters of the form B'00000000', counter 360b records the number of detected characters of the form B'00000001', ..., counter 360n records the number of detected characters of the form B'11111111'.

Responder 300 also contains an accumulator 361, which is connected to each of the 256 pattern alarm lines (144a, 144b, 144n). Each pattern alarm causes its associated counter to increment by +1 and it also causes the accumulator 361 to increment by +1. In this manner, accumulator 361 contains a value equal to the sum of the values in the 256 counters (360a, 360b, ..., 360n). When accumulator 361 reaches a predefined threshold value, program latch 302 is set. An accumulator size and threshold value are selected so that enough characters are sampled from the data portion of the frame or frames to allow a meaningful statistic to be calculated. For example, a few hundred characters would ordinarily suffice to discriminate plaintext from ciphertext, although a value of 1000 shall be selected in order to illustrate the process to be used. When processor 305 is not busy producing and transmitting a security alert message, processor 305 is busy monitoring program latch 302. When processor 305 detects that program latch 302 has been set, it reads the counter values (360a, 360b, ..., 360n), resets the counters to zero, and resets program latch 302. The counters are read and reset before Hershey adaptive, active monitor is able to send another pattern alarm 144, thus preventing loss of information. Once the counters (360a, 360b, ..., 360n) have been read and reset, Hershey adaptive, active monitor continues, as before, sending pattern alarms (144a, 144b, ..., 144n).

Processor 305 first calculates a value phi $= f1(f1-1) + f2(f2-1) + ... + f256(f256-1)$, where fi represents the value of the ith counter 360i read by processor 305. If the calculated value of phi is greater than $(3902 + 88t)$, where t is a preestablished value which can be configured within processor 305 then it may be concluded that the sampled text was not random text (or ciphertext). In practice, t would be a value greater than 3 (representing three sigma) and would likely be a value between 5 and 10. In short, t is chosen so as to make it extremely improbable that an observed value of phi $> (3902 + 88t)$ is the result of sampled random text (or ciphertext). The statistical test described here is based on the phi test described in Solomon Kullback's Statistical Methods in Cryptanalysis, pp. 37–39. According to Kullback, the expected value of phi, denoted E(phi), is given by the formula $E(phi) = (1/n)(N)(N-1)$ where n is the number of possible characters and N is the sample size. Substituting n=256 and N=1000, a value of E(phi)=3902 is calculated. Kullback also states that the standard deviation of phi is equal to the square root of $(2(n-1)/(n)(n)) \cdot N(N-1)$. Substituting n=256 and N=1000, the standard deviation of phi is calculated as 88. Roughly speaking about ⅔ of the samples of random text (or ciphertext) will have computed values of phi that lie between 3902−88 and 3902+88, i.e., within one sigma plus or minus of the expected value of phi. The expected value is also called the mean. For practical purposes, nearly all computed values of phi will lie between plus or minus 10 sigma of the mean. Thus to observe a value greater than 10 sigma from the mean would be very unlikely if the sample was taken from random text (or ciphertext). The motivation for the phi test (according to Kullback) is as follows: "It is to be expected, that the variation in the number of occurrences of the n possible elements of a text of N elements would be greater for non-random text than for random text." Essentially, the squaring operation performed in the calculation of phi magnifies the variations in frequency produced by non-random text, thus permitting one to discriminate non-random text from random text.

Consider a plaintext character set consisting of the upper and lower case alphabetics (52 characters), the numerics (10 characters), and common punctuation (18 characters). In ordinary text produced from this character set there will be a higher concentration of alphabetic characters (mostly lower case), with some numerics and punctuation characters. But suppose for the sake of argument that text produced with this character set is randomly distributed over the character set of 75 characters. Note that E(phi) for random text is less than E(phi) for non-random text. Substituting n=75 and N=1000 in the equations for E(phi) and standard deviation, the value of E(phi)=13320 and the standard deviation of phi is equal to 159. Note that the mean of 13320 for random text over the character set of 75 characters is less than the mean for non-random text over the character set of 75 characters. But the real thing to note here is that 10 standard deviations from E(phi)=3902 for random text over a 256 character set gives a range (3022, 4782) and 10 standard deviations from E(-phi)=13320 for random text over a 75 character set gives a range (11730, 14910), which means that these distributions are not overlapping. In this case, there should be no plaintext samples that result in a calculated value of E(phi) that falls in the range (3022, 4782) and there should be no ciphertext sample that result in a calculated value of E(phi) that falls in the range (11730, 14910).

Continuing now with a description of the processing performed by processor 305, if the value of phi is greater than (3902+88t), then security alert message production means 331 produces a security alert message 341 of the type shown in FIG. 7, containing (1) a security agent identifier 321, (2) a security code consisting of a category = "suspicious_plain_text" and a type field set to NULL, and (3) a sequence number counter 325. Otherwise, if the so-calculated value of phi is not greater than (3902+88t), then no security alert message is produced and transmitted. In that case, processor 305 again scans program latch 302 waiting for it to be set. Message authentication code production means 332 next produces a MAC 342 on the so-produced security alert message 341. Security Alert message transmission means 306 then transmits SAM 341 and MAC 342 to the network security manager via bit stream 124.

In the situation where ONLY compressed data is transmitted in bit stream 124, it may be possible to adapt the above test to distinguish compressed plaintext from ciphertext. However, this may depend on the quality of the compression being used and it may also depend on a knowledge of the compression algorithm itself in order to construct a testing algorithm that is assured of success. For example, it may be necessary for adaptive, active monitor 100 to be configured to scan for diagrams (2-letter groups) or trigrams (3-letter groups), since the compression algorithm may be very good at "flattening" the frequency distribution of single letters. That is, a test involving only single letters may be insufficient to distinguish compressed plaintext from ciphertext, at least for sample sizes which are considered practical. For example, it would do little good if one could distinguish compressed plaintext from ciphertext if it required a sample size of 10 million characters. But by knowing something about the compression algorithm itself, one has a much better chance of constructing a sampling and testing algorithm to detect differences between compressed plaintext and ciphertext. Those skilled in the art will also recognize that from one perspective the goal of compression techniques is to remove the redundancy commonly associated with any ordinary natural language such as English. The more redundancy that one can remove from a compressed text the more it looks like random text or ciphertext. However, an excellent encryption algorithm such as the Data Encryption Algorithm will produce ciphertext that is hardly distinguishable from random text. On the other, a good compression algorithm will produce compressed text that will generally have some, even a small amount, of redundancy left in it. Hence, the compressed text will not look as much like random text as the ciphertext produced with the DEA will look like random text. This small difference between compressed text and ciphertext is enough to be distinguished provided a large enough sample size is used. In theory, one can distinguish compressed text from ciphertext if a large enough sample size is used. In practice, one can distinguish compressed text from ciphertext only if the compression algorithm is a poor one or some feature of the compression algorithm can be exploited to allow the testing algorithm to operate with only small or modest sample sizes. In summary, the testing procedure described above can in some situations (depending on the compression algorithm) be used to distinguish compressed plaintext from ciphertext—provided a large enough sample size is used. In other cases, the adaptive action monitor 100 must be reconfigured to scan for particular patterns (such a diagrams and trigrams).

FIG. 12 is an example embodiment of pattern alarms and counters of FIG. 8 configured for virus detection. Referring to FIG. 12, the pattern alarms 144a, 144b, ..., 144n originating with adaptive, active monitor 100 of FIG. 4 are each uniquely associated with a particular characteristic viral pattern. Adaptive, active monitor 100 scans bit stream 124 for these virus patterns, which are character strings or patterns that uniquely identify each virus. As in FIG. 8, the pattern alarms 144a, 144b, ..., 144n from the Hershey adaptive, active monitor 100 are applied to counters 360a, 360b, ..., 360n, respectively. In this way, a clever adversary can not flood the network with viral agents hoping that some will escape detection by over running responder 300. The sizes of counters 360a, 360b, 360n are set so that the number of pattern alarm signals does not cause a counter overflow during the interval of time in which a security alert message is produced and transmitted. For example, 32-bit counters are more than adequate to prevent counters from overflowing. Otherwise, the processing steps to handle a detected virus are the same as those already described in and for FIG. 8.

Those skilled in the art will recognize that the viral patterns described in FIG. 12 may be static patterns or dynamically configurable patterns, depending on how adaptive, active monitor 100 is designed. The Hershey adaptive, active monitor is capable of dynamic re-configuration, thus enabling the security agent 10 to be updated in real time to detect the presence of a suspected offending virus. Following such a re-configuration, which will also cause the type field associated with security code 322 to be adjusted so that each pattern alarm is uniquely associated with a corresponding virus type, both the adaptive, active monitor 100 and responder 300 of security agent 10 of FIG. 4 will operate normally as before.

An example embodiment of pattern alarms and counters for FIG. 8 configured for virus detection, is shown in FIG. 12.

A system and method has been described for monitoring and responding to security events for various network security applications. One mode of response is for the SA to transmit status or commands to other network components via non-network channels. Another mode of response is for the SA to communicate to other network components via the network itself. The following paragraphs explain how this latter mode of communication can be favorably implemented.

Figure 13:
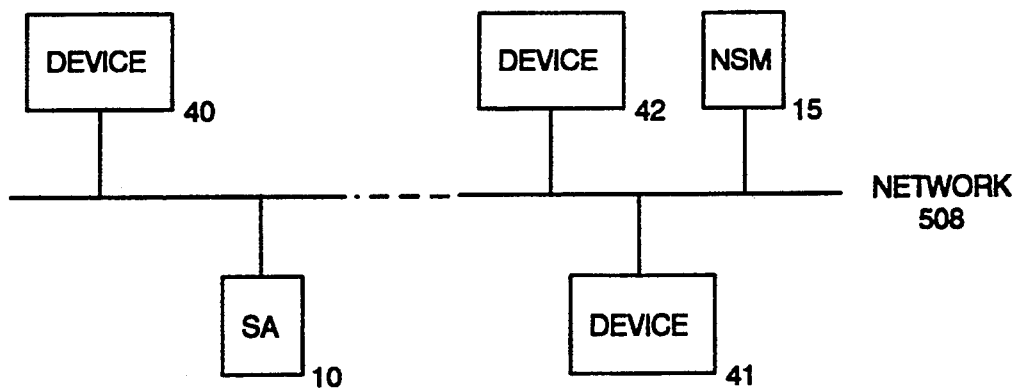
FIG. 13 illustrates a general network consisting of a plurality of network-attached devices, a Security Agent (SA), and a Network Security Monitor (NSM).

FIG. 13 illustrates a general network consisting of a plurality network-attached devices 40, 41, and 42. Devices 40, 41, and 42 are any devices such as hosts, servers, or workstations which communicate with one another via the network 508. Network 508 is a serial bit stream. Network 508 can also be a parallel data stream (e.g., a processor bus). A single SA 10 is attached to the network; SA 10 is configured to monitor the attached network for the occurrence of security events and to respond to the occurrence of security events by transmitting a security alert message to a Network Security Manager NSM 15. The Network Security Manager 15 is a network-attached device (e.g., host or workstation) whose role is to collect security alert messages from one or more SAs in one or more attached networks, and to take action in response to the receipt of the security alert messages. The NSM can be a workstation which displays the occurrence of security events in the network, and permits a Network Security Administrator to issue commands or messages to other network devices in response to received security alert messages.

In order for two network-attached devices such as the SA 10 and NSM 15 to communicate, it is necessary that there exist a network access protocol. A network access protocol, or just protocol, is a set of rules and formats defining the manner in which two network participants can communicate with one another.

Figure 14:
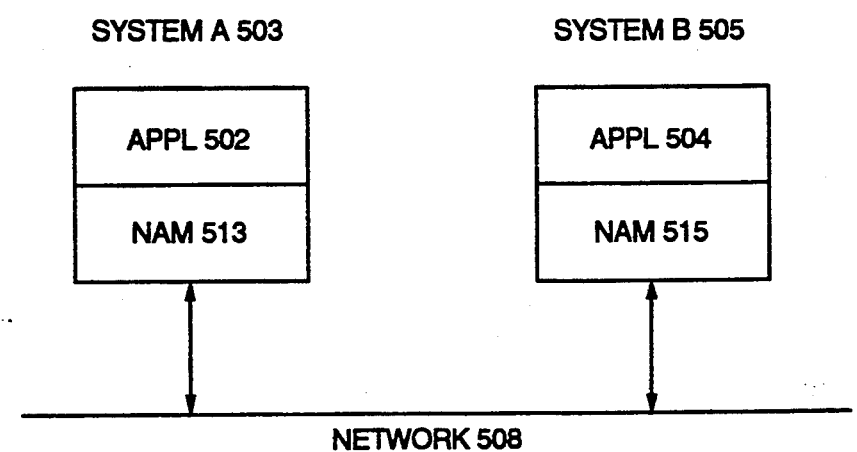
FIG. 14 illustrates a simple network architecture consisting of a first application in a first network-attached system communicating through a first network access method to a second application in a second network-attached system via a second network access method.

FIG. 14 illustrates a simple network architecture consisting of a first application APPL 502 in a first system A 503 communicating with a second application APPL 504 in a second system B 505 via some network 508. Network 508 here is the serial bit stream illustrated as bit stream 124 in FIG. 3. The skilled reader will appreciate that Network 508 can be a parallel bit stream by making use of the parallel monitoring capabilities of the adaptive, active monitor described by Hershey, et al. in Ser. No. 08/138,045, cited above.

In order to communicate with one another, each system implements the same network access protocol in a network access method. The network access method is typically a combination of hardware and software which is accessible to calling application programs for the purposes of transmitting and receiving data in accordance with a prescribed network access protocol. System A 503 implements the network access protocol in a first network access method NAM 513. System B 505 implements the same network access protocol in a second network access method NAM 515. Although the actual implementations of the network access methods may differ on the two systems, the syntax, semantics, and timing of the implemented protocols must be the same.

In a typical computer communications architecture, the protocols are layered into a structured set of sub-protocols. Each layer performs a specific function of the overall communication task. The Open Systems Interconnection (OSI) model, shown in FIG. 15, depicts one such layered protocol structure.

Figure 16:
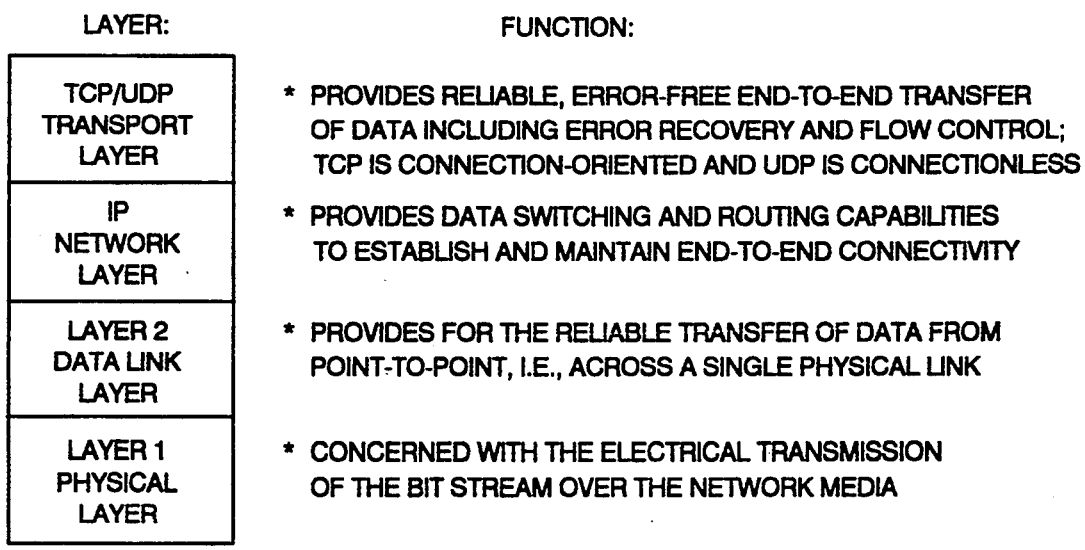
FIG. 16 depicts the Transmission Control Protocol/Internet Protocol (TCB/IP) protocol stack.

Note that the number of layers and the functionality assigned to each layer varies depending on the protocol. Transmission Control Protocol/Internet Protocol (TCP/IP) has only four layers. The functions of the OSI application layer, presentation layer, session layer, and transport layer are all handled to some degree by the TCP/UDP layer, layer 4. TCP is the layer 4 protocol for reliable, connection-oriented data transfer. UDP, the User Datagram Protocol, is the layer 4 protocol for connectionless data transfer. FIG. 16 depicts the TCP/IP protocol stack. Most of the variation in modern net working protocols is confined to the upper layers. IEEE 802 standards for layer 2 define the means by which most network access methods implement the low-level media access for token-ring, Carrier-Sense Multiple Access with collision detection (CSMA/CD), Fiber Distributed Data Interface (FDDI), and other network types. Likewise, standards exist which further define the layer 1 signalling techniques and electrical interfaces for each of the network media types (e.g., Manchester encoding).

Data which is transmitted from one system to another progresses down the protocol "stack." At each layer, the output from the previous, upper layer is encapsulated within a larger data block known as a protocol data unit for that layer. For example, the input to layer 3 is a Transport Protocol Data Unit, the output from layer 3 is a Network Protocol Data Unit. The protocol data unit contains the protocol data unit of the previous layer and some header and control information. At the recipient, each layer of the stack removes and interprets the control information, passing the underlying protocol data unit to the next higher layer.

The network access method is typically implemented in a combination of hardware and software. The lower layers of the network protocol stack are typically implemented in hardware on a network interface adapter. The higher layers (e.g., 4 through 7 of the OSI stack) are typically implemented in software in a host processor to which the network adapter is attached. An application programming interface (API) between an application program APPL and layer 7 provides access to various functions of the network access method. The functions may include the ability to establish a session with a remote application, to send or receive messages from a remote application, and to close the session with the remote application.

Furthermore, the communicating applications APPL implement an application communications protocol which defines the syntax, semantics, and timing of messages transmitted from one application to another. For example, the applications may implement a protocol which requires that an application wait to receive a special "polling" request message before transmitting a message to the other application. In a token-ring network, the polling mechanism may be implemented as follows. A first application at a first device periodically broadcasts a poll message. The poll message is a short message containing a flag field and an identifier field. A second application at a second device receives the poll message, removes it from the network, and checks to see if it has any messages to send to the first device. If so, the second application checks to see if the flag field is already set to indicate that some other application at another device has already requested to transmit a message (in which case, the second application must wait for another poll message). If the poll message flag field is not set, the second application modifies the flag field and identifier fields to indicate that the second application has a message it would like to send to the first application. The second application then retransmits the modified poll message to the next device on the ring. The poll message circulates around the ring in this manner until it arrives back at the originating device. The first application receives the modified poll message, removes it from the network, and tests the flag field to determine if any of the devices on the network want to transmit a message. If so, the first application then builds an "envelope" message and transmits it directly to the second application based on the network address associated with the contents of the identifier field of the modified poll message. Upon receipt of the envelope message, the second application removes it from the network, inserts the message it wishes to transmit into a reserved field of the envelope message, and retransmits the envelope message directly to the first application based on the source address contained in the original envelope message. Upon receipt of the envelope message, the first application processes the message contained therein, and broadcasts a new poll message on the network.

A different application communications protocol can be implemented that allows a first application to transmit a new, unsolicited message to a second application. The first application need not wait for an acknowledgment, or a poll message, before transmitting a message to an intended recipient application. Furthermore, the first application can build a new message rather than intercepting and modifying an existing message on the network. The application addresses the message to a second application based on a hard-coded, non-volatile network address. Alternately, the address may be configured at application initialization or installation-time and stored in a volatile or nonvolatile storage.

Yet another application communications protocol can be implemented that allows a first application to multi-cast a message to two or more recipient applications. Again, the distribution list of network addresses is hard-coded in non-volatile storage or it may be configured at application initialization or installation-time and stored in volatile storage. An application multi-casts a single message by transmitting the same message to two or more recipient applications, modifying only the destination address fields of the message.

The interested reader can refer to the text, "Data and Computer Communications," by William Stallings, published by McMillen Publishing Company, New York, N.Y., for additional discussions of network access method implementation and general communications architecture topics.

In the present invention, the application communications protocol is implemented by a Security Alert Message Transfer Method which implements a protocol which permits the SA to transmit security alert messages in an unpolled manner. The skilled reader will appreciate that the Security Alert Message Transfer Method can favorably implement a polled application communications protocol instead.

Figure 17:
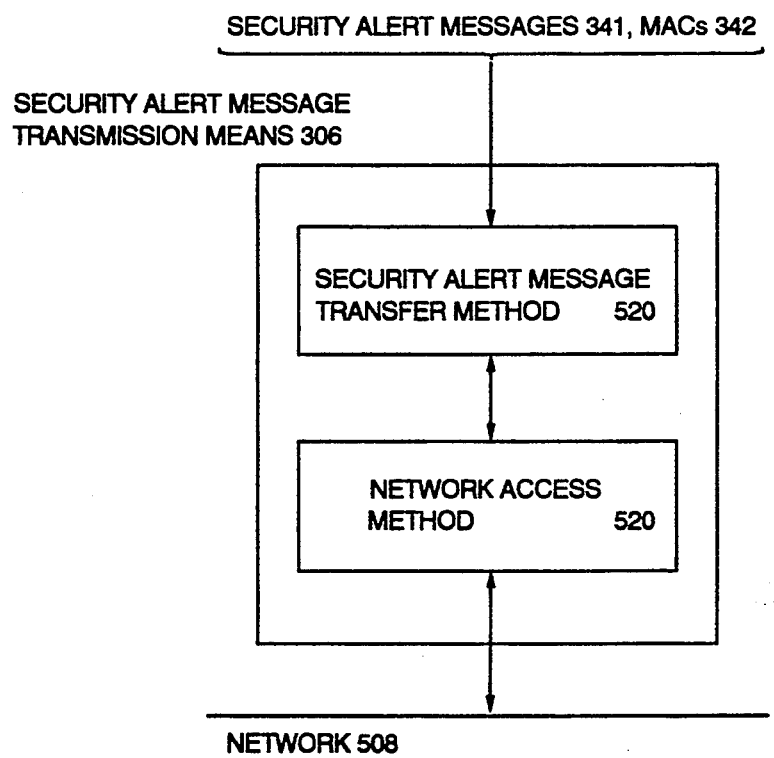
FIG. 17 is a block diagram of the Security Alert Message Transmission Means 306

FIG. 17 is a block diagram showing the Security Alert Message Transmission Means 306 consisting of a Security Alert Message (SAM) Transfer Method 520 and a Network Access Method (NAM) 513. The SAM Transfer Method 520 implements the high-level Security. As described before, the NAM 513 implements the network protocols necessary to route messages in the network.

The network access method to be described for the present invention can take on many forms depending on the network protocol to be implemented. In fact, the embodiment of this invention need only implement those layers of the protocol necessary to route the security alert messages from the SA to the intended recipient (e.g., NSM). For the sake of completeness, two variations of the network access method shall be described: (1) a method that permits routing of security alert messages within a single physical network segment independent of the upper layer protocols in use on that network segment and (2) a method that permits routing of security alert messages through an internetwork of TCP/IP-based devices. In both cases, the communications architecture model to be considered is that of TCP/IP, as illustrated in FIG. 16.

Figure 18:
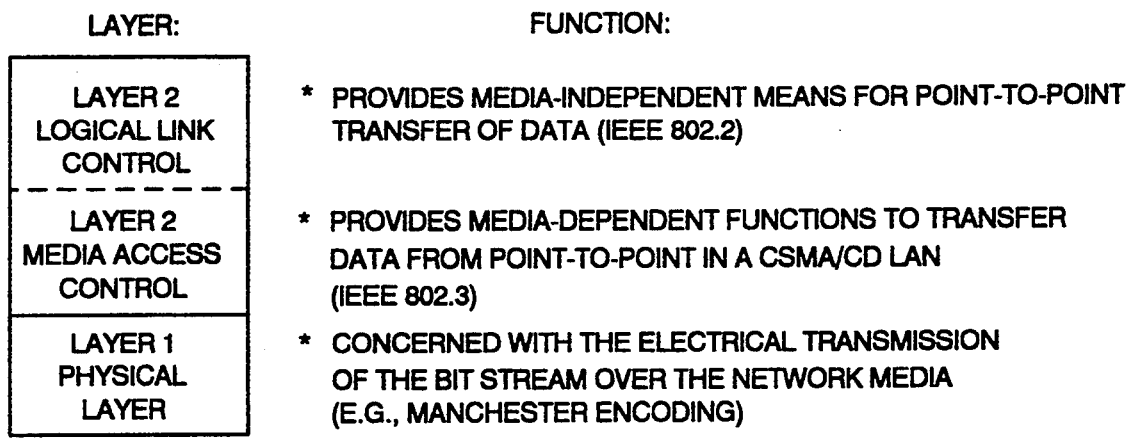
FIG. 18 depicts the Physical layer and the sub-layers of the Data Link Layer in a Carrier-Sense Multiple Access with Collision Detection or CSMA/CD (IEEE 802.3) Local Area Network architecture.

In method 1, all that is required of the network access method is to satisfy the protocol requirements necessary to transmit a message on a single network segment. The network access method of the SA need not concern itself with inter-network routing, session establishment, or other protocol functions above the Data Link Layer (layer 2). The network access method must construct a protocol data unit which satisfies the format requirements of the layer 2 protocol being used in the network. For example, suppose that Network 508 of FIG. 13 is a CSMA/CD Local Area Network (LAN) that complies with IEEE 802.2 for the Logical Link Control (LLC) sub-layer and IEEE 802.3 for the Media Access Control (MAC) sub-layer of the Data Link Layer (layer 2) of the network communications architecture. Note that the MAC referred to here is not to be confused with the Message Authentication Code (MAC) referred to in FIG. 6. These sub-layers are depicted in FIG. 18.

The SAM Transfer Method of the SAM Transmission Means accepts a security alert message and builds a LLC protocol data unit L-PDU. The network access method then encapsulates the L-PDU in a MAC frame. The MAC frame is then transmitted according to the Physical Layer signaling protocol.

Figure 19:
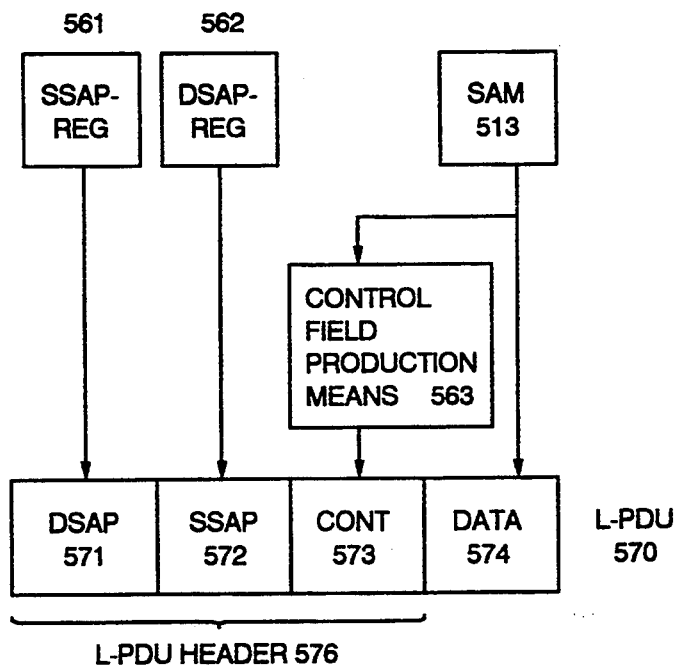
FIG. 19 is a block diagram of the implemented Logical Link Control sub layer of the Data Link Layer in the Network Access Method of the SA.

FIG. 19 is a block diagram of the LLC sub-layer implementation within the Network Access Method 513 showing the construction of an L-PDU 570 from the input security alert message SAM 341 and the contents of the registers SSAP-REG 561 and DSAP-REG 562 of the Network Access Method 513. SSAP-REG 561 contains the source service access point address. DSAP-REG 562 contains the destination service access point address. Both the SSAP-REG and DSAP-REG register contents are loaded at system configuration time or are hard-coded. The SAM 513 is also input to the Control Field Production Means 563; the output of the Control Field Production Means 563 is put into the CONT field 573 of the L-PDU 570.

FIG. 20 is a block diagram of the MAC sub-layer implementation within the Network Access Method 513 showing the construction of a CSMA/CD MAC frame 590 from the L-PDU 570 constructed above. The rest of the fields of the MAC frame 590 consist of the contents of the pre-configured registers DA-REG 583 and SA-REG 584, the constant preamble PRE 591 and constant starting delimiter SD 592 produced by the Fixed MAC Field Production Means 581, the length field LEN 595 calculated on the input L-PDU 570 by the LEN CALC MEANS 585, the optional padding PAD 597 whose length depends on the contents of the calculated length field LEN 595, and finally the Frame Check Sequence FCS 598 calculated from the input L-PDU 570 by the FCS CALC MEANS 588.

The Network Access Method 513 (see FIG. 17) in a LAN must also follow the media access rules of the MAC sub-layer of the Data Link Layer. In IEEE 802.5 compliant token-ring networks, a station on the ring cannot originate a MAC frame until it has received a "free" token. The token is a special MAC frame which circulates around the ring and is used to control access to the ring. A station which wishes to transmit a message must modify the Access Control field of the token, thus marking it as a "busy" token. The station then retransmits the busy token followed by its message, formatted as a MAC frame as described above and illustrated in FIG. 19 and FIG. 20. Once the busy token and message frame have circulated around the ring (and hopefully been copied by the recipient station addressed in the MAC frame) and have arrived back at the originating station, the originating station can remove the busy token and message frame from the ring and insert a new free token.

In 802.3 compliant CSMA/CD networks, a station on the LAN must listen before transmitting. If the LAN is "quiet," the station may transmit its MAC frame while continuing to listen for "collisions" caused by propagational delays. If a collision is detected, the station jams the network for a certain period then backs off the network for a random period. Once the back-off period is completed, the station is free to contend for the network as before. The interested reader can refer to "Local Networks," by William Stallings for more information on LAN access mediation, token-ring implementation, and other protocol topics.

As described in the book, "Local Networks," by William Stallings, supra the network access method need only implement the bottom two layers (Data Link Layer and Physical Layer) in order to allow messages to be transmitted in a LAN environment. However, the NAM 513 in the present invention may have to implement higher layers in order to interoperate with network devices which implement these higher layer protocols. For example, if the Network 508 to which the SA is attached is interconnected with a second Network 508' via a Layer 3 routing device (e.g., a router), then the NAM 513 must also implement the Network Layer protocols. The protocols at the Network Layer (Layer 3) are used to convey network addressing and control information needed by internetworking devices to route the data from one network, say Network 508, to a second network, say Network 508'. FIG. 21 is a block diagram illustrating an internetwork configuration consisting of an SA 10 attached to a first network 508 communicating by a router 550 to an NSM 15 attached to a second network 508'. The router performs the function of forwarding security alert messages from the SA 10 to the NSM 15. The router also forwards other message types from other network-attached devices 40 in network 508 to one or more network-attached devices 41 and 42 in network 508'. The router allows devices in a network employing one set of network addresses to communicate with devices in a second network employing a second set of network addresses. The router forwards messages based on the source and destination addresses contained in the Network Layer PDU (N-PDU). Thus, an SA 10 wishing to transmit a security alert message through a router to a second network 508' must implement the Network Layer protocol in the network access method. The functions of the network access method 513 are identical to that described for FIG. 19 and FIG. 20 except the security alert message is first encapsulated in a network layer protocol data unit N-PDU not shown. The source and destination network addresses contained in the N-PDU are hard-coded in the network access method 513. The source and destination network addresses may also be retrieved using other network protocols such as ARP (Address Resolution Protocol), as described in "Internetworking with TCP/IP," Volume I, by Douglas E. Comer.

Figure 22:
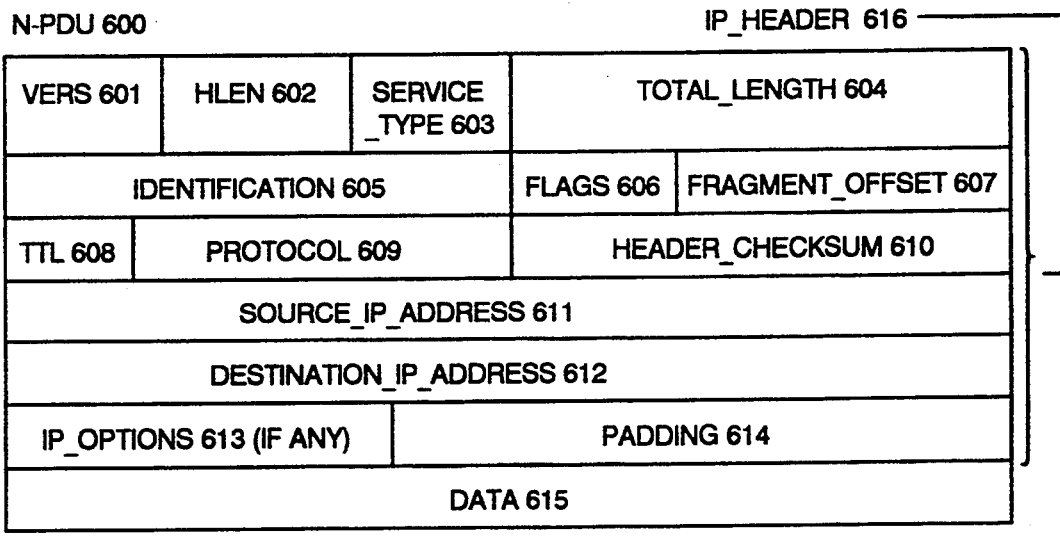
FIG. 22 depicts the format of the Network layer Protocol Data Unit.

The format of the N-PDU is shown in FIG. 22. In TCP/IP, the N-PDU 600 is also referred to as an Internet Protocol "packet." The fields VERS 601, HLEN 602, SERVICE_TYPE 603, FLAGS 606, TTL 608, PROTOCOL 609, SOURCE_IP_ADDRESS 611, and DESTINATION_IP_ADDRESS 612 are all constructed from pre-configured values or hard-coded constants. The fields TOTAL_LENGTH 604 and HEADER_CHECKSUM 610 may be calculated using means that are not shown but obvious to one skilled in the topic. Likewise, the fields IDENTIFICATION 605 and FRAGMENT_OFFSET 607 may be calculated based on counters and memory registers not shown. Fields IP_OPTIONS 613 and PADDING 614 are typically not required. Guidance on the specific definition and implementation of the IP packet format are further explained by Douglas E. Comer in "Internetworking" with TCP/IP, Volume I.

Figure 23:
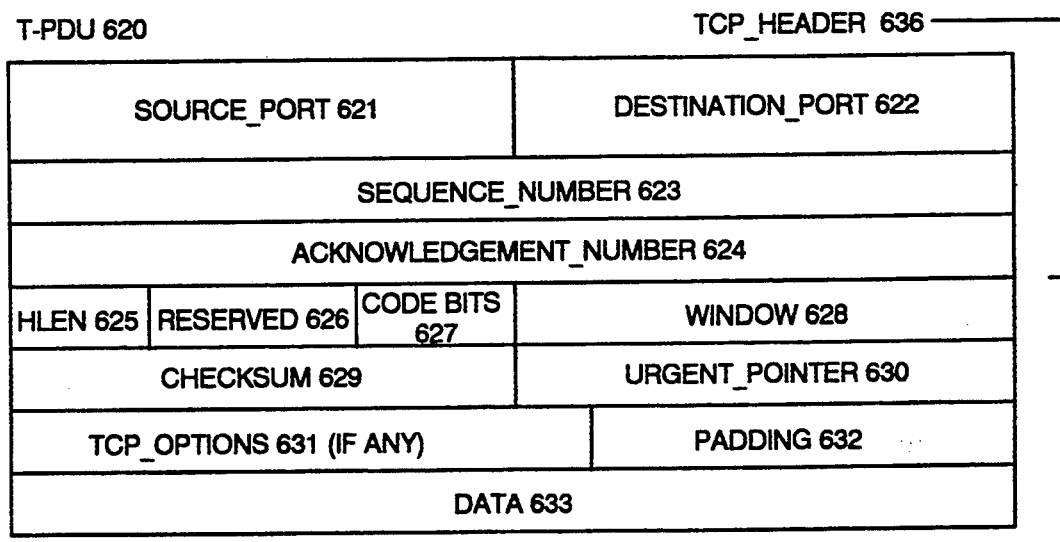
FIG. 23 depicts the format of the Transport layer Protocol Data Unit.

The DATA 615 field of FIG. 22 consists of the next higher layer protocol data unit. If the SAM Transfer Method is the next higher layer, then the Security Alert Message is inserted in the field DATA 615. In TCP/IP, however, the next higher layer protocol unit is the TCP "segment," hereafter referred to as the Transport PDU or T-PDU. The format of the TCP T-PDU is shown in FIG. 23. The fields SOURCE_PORT 621, DESTINATION_PORT 622, HLEN 625, CODE_BITS 626, and URGENT_POINTER 630 are all constructed from pre-configured values or hard-coded constants. The DATA 633 field contains the Security Alert Message to be transmitted. The fields TCP_OPTIONS 631 and PADDING 632 are typically not needed. All other fields in the T-PDU 620 are constructed using counters, stored values, and simple algorithmic means which are described by Douglas E. Comer in "Internetworking with TCP/IP," Volume I and well-known to those skilled in the topic.

Figure 24:
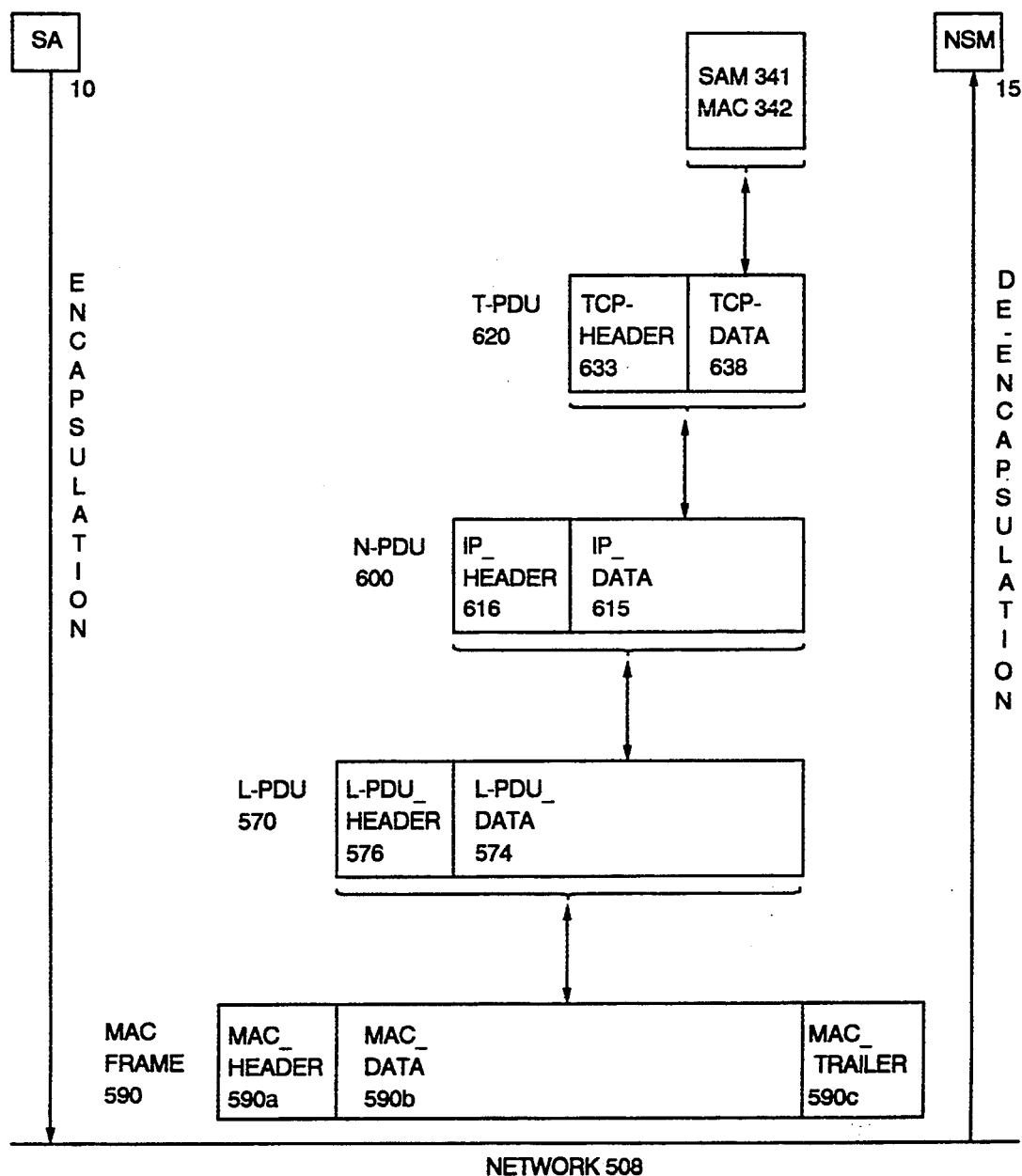
FIG. 24 illustrates the symmetric processes of protocol data unit encapsulation at a transmitting Security Agent and protocol unit de-encapsulation at a receiving Network Security Manager.

The skilled reader will understand that corresponding functions exist in the Network Access Method of the receiving station (e.g., the NSM) to de-encapsulate first the L-PDU from the received MAC frame, then to de-encapsulate the N-PDU from the L-PDU, then to de-encapsulate the T-PDU from the N-PDU, and finally to de-encapsulate the Security Alert Message from the T-PDU. The symmetric processes of encapsulation at the SA and de-encapsulation at the NSM are illustrated in FIG. 24.

An alternate embodiment of the SAM Transmission Means 306 could be realized by "piggybacking" a simple alert mechanism on top of an existing network protocol which itself may or may not be implemented within the SA 10. In this embodiment, the Security Alert Message takes the form of one or more flag bits which are inserted into a reserved area of an existing network frame. The SAM Transmission Means 306 employs a Hershey adaptive, active monitor to detect a starting delimiter for a free reserved area in an network frame as it passes through the SA 10 network interface. Once detected, if the SA 10 has a security event to report, the adaptive, active monitor can trigger a parallel FSM which modifies one or more bits in the frame prior to its retransmission at the network interface. Other network-attached devices employ similar devices to detect the presence of the predefined flag bit settings and take action in response. The device may in turn activate a program in an attached processor to construct a second, detailed Security Alert Message and transmit the message to other network devices or the Network Security Manager. This embodiment has the advantages that the SAM Transmission Means need not implement a protocol stack, it makes more efficient use of network bandwidth, and it provides a simple mechanism to distribute the responding means to multiple receiving devices in cases where the SA 10 lacks the processing resources to act as a full-fledged network participant. Furthermore, the use of the Hershey adaptive, active monitor to detect the reserved field starting delimiter and to modify the flag bits of the reserved field allow the use of this technique in a high speed communications environment.

Although specific embodiments of the invention have been disclosed, it will be understood by those having skill in the art, that changes can be made to those embodiments, without departing from the spirit and the scope of the invention.

What is claimed is:

1. A network security architecture system, with an adaptable, simultaneously parallel array of finite state machines, for monitoring the security of a data communications network, comprising:

a first finite state machine in said array, including a first memory, a first address register coupled to said network, a first start signal input and a first security threat pattern detection output coupled to a first counter, said memory thereof storing a first finite state machine definition for detecting a first data security threat pattern on said network;

a second finite state machine in said array, including a second memory, a second address register coupled to said network, a second start signal input and a second security threat pattern detection output coupled to a second counter, said memory thereof storing a second finite state machine definition for detecting a second data security threat pattern on said network;

a third finite state machine in said array, including a third memory, a third address register coupled to said network, a third start signal input and a third security threat pattern detection output coupled to a third counter, said memory thereof storing a third finite state machine definition for detecting a third data security threat pattern on said network;

a programmable interconnection means coupled to said first, second and third finite state machines, for selectively interconnecting said first security threat pattern detection output to at least one of said second and third start signal inputs;

a security event vector assembly means, having inputs coupled to said first, second and third counters, for assembling a security event vector from an accumulated count value in said first counter and at least one of said second and third counters, representing a number of occurrences of said first data security threat pattern and at least one of said second and third data security threat patterns on said network; and a responding means, having an input coupled to said security event vector assembly means, an array output coupled to said memory of said first, second and third finite state machines, and a configuration output coupled to said programmable interconnection means, for receiving said security event vector and in response thereto, changing said array to change data security threat patterns to be detected on said network.

2. The system of claim 1, wherein said responding means, in response to receiving said security event vector, changes a first interconnection arrangement of said first security threat pattern detection output being connected to said second start signal input, to a second interconnection arrangement of said first security threat pattern detection output being connected to said third start signal input.

3. The system of claim 1, wherein said responding means, in response to receiving said security event vector, changes a first interconnection arrangement of said first security threat pattern detection output being connected to said second start signal input, to a second interconnection arrangement of said first security threat pattern detection output being connected to both said second start signal input and to said third start signal input, for simultaneous, parallel finite state machine operation.

4. The system of claim 1, wherein said responding means, in response to receiving said security event vector, outputs new finite machine definition data to at least said first memory to change said first data security threat pattern to be detected.

5. The system of claim 1, wherein said responding means is coupled to said network, and in response to receiving said security event vector, outputs a control signal to said network to alter communication characteristics thereof.

6. The system of claim 1, wherein said security threat is the occurrence of inappropriate words.

7. The system of claim 1, wherein said security threat is the occurrence of a proprietary notice.

8. The system of claim 1, wherein said security threat is the occurrence of use of computing resources for non-authorized purposes.

9. The system of claim 1, wherein said security threat is the occurrence of copyright protected data.

10. The system of claim 1, wherein said security threat is the occurrence of company confidential information.

11. The system of claim 1, wherein said security threat is the occurrence of unencrypted data.

12. The system of claim 1, wherein said security threat is the occurrence of a plurality of intrusions by an adversary who attempts to gain access to a system using repeated login requests.

13. The system of claim 1, wherein said first, second and third finite state machines are formed on an integrated circuit chip.

14. The system of claim 1, wherein said first, second and third finite state machines are formed in task memory partitions of a multi-tasking data processor.

15. The system of claim 1, which further comprises: said responding means receiving said computer security event vector and in response thereto, performing security monitoring and control operations on said data communications network.

16. The system of claim 15, which further comprises: said responding means receiving said computer security event vector and in response thereto, transmitting a security alarm signal on said network.

17. The system of claim 1, wherein said security threat is the occurrence of a natural language pattern.

18. The system of claim 1, wherein said security threat is an intrusion detection pattern.

19. The system of claim 1, wherein said security threat is the occurrence of plaintext in said data communications network, where ciphertext is required to maintain security.

20. In a network security architecture system, with an adaptable, simultaneously parallel array of finite state machines, a method for monitoring the security of a data communications network, comprising:

storing a first finite state machine definition for detecting a first data security threat pattern on said network, in a first finite state machine in said array, including a first memory, a first address register coupled to said network, a first start signal input and a first security threat pattern detection output coupled to a first counter;

storing a second finite state machine definition for detecting a second data security threat pattern on said network, in a second finite state machine in said array, including a second memory, a second address register coupled to said network, a second start signal input and a second security threat pattern detection output coupled to a second counter;

storing a third finite state machine definition for detecting a third data security threat pattern on said network, a third finite state machine in said array, including a third memory, a third address register coupled to said network, a third start signal input and a third security threat pattern detection output coupled to a third counter;

selectively interconnecting said first security threat pattern detection output to at least one of said second and third start signal inputs;

assembling a security event vector from an accumulated count value in said first counter and at least one of said second and third counters, representing a number of occurrences of said first data security threat pattern and at least one of said second and third data security threat patterns on aid network; and receiving said security event vector and in response thereto, changing said array to change data security threat patterns to be detected on said network.

21. The system of claim 20, wherein in response to receiving said security event vector, changing a first interconnection arrangement of said first security threat pattern detection output being connected to said second start signal input, to a second interconnection arrangement of said first security threat pattern detection output being connected to said third start signal input.

22. The method of claim 20, wherein in response to receiving said security event vector, changing a first interconnection arrangement of said first security threat pattern detection output being connected to said second start signal input, to a second interconnection arrangement of said first security threat pattern detection output being connected to both said second start signal input and to said third start signal input, for simultaneous, parallel finite state machine operation.

23. The method of claim 20, wherein in response to receiving said security event vector, outputting new finite machine definition data to at least said first memory to change said first data security threat pattern to be detected.

24. The method of claim 20, wherein in response to receiving said security event vector, outputting a control signal to said network to alter communication characteristics thereof.

25. The method of claim 20, wherein said security threat is the occurrence of inappropriate words.

26. The method of claim 20, wherein said security threat is the occurrence of a proprietary notice.

27. The method of claim 20, wherein said security threat is the occurrence of use of computing resources for non-authorized purposes.

28. The method of claim 20, wherein said security threat is the occurrence of copyright protected data.

29. The method of claim 20, wherein said security threat is the occurrence of company confidential information.

30. The method of claim 20, wherein said security threat is the occurrence of unencrypted data.

31. The method of claim 20, wherein said security threat is the occurrence of a plurality of intrusions by an adversary who attempts to gain access to a system using repeated login requests.

32. The method of claim 20, wherein said first, second and third finite state machines are formed on an integrated circuit chip.

33. The method of claim 20, wherein said first, second and third finite state machines are formed in task memory partitions of a multi-tasking data processor.

34. The method of claim 20, which further comprises: receiving said computer security event vector and in response thereto, performing security monitoring and control operations on said data communications network.

35. The method of claim 34, which further comprises: receiving said computer security event vector and in response thereto, transmitting a security alarm signal on said network.

36. A method for information collection by adaptive, active security monitoring of a serial stream of data having a characteristic virus pattern including a first occurring and a second occurring virus pattern portions, comprising the steps of:

receiving x-bit words from said serial data stream, in a first n-bit address register having a first portion with n-x bits and an second portion with two bits and an input to said second portion coupled to said serial stream;

accessing a first-addressable memory having a plurality of data storage locations, each having a first portion with n-x bits, said first memory having an n-bit address input coupled an output of said first address register, said first memory configured with data stored in first and second ones of said data storage locations to represent a first digital filter for said first occurring virus pattern;

transferring data over a feedback path from an output of said first memory to an input of said first register, for transferring said data from said first one of said data storage locations in said first memory to said first portion of said first address register, for concatenation with said x-bit words from said serial bit stream to form an address for said second one of said data storage locations of said first memory;

outputting a start signal from said second one of said data storage locations of said first memory having a start signal value stored therein, which is output when said first occurring portion of said characteristic virus pattern is detected by said digital filter;

receiving x-bit words from said serial data stream, in a second p-bit address register having a first portion with p-x bits and a second portion with a plurality of x bits and an input to said second portion coupled to said serial stream, for receiving x-bit words from said serial data stream;

said second address register coupled to said first memory, for receiving said start signal value from said first memory;

accessing a second addressable memory having a plurality of data storage locations, each having a first portion with p-x bits, said second memory having a p-bit address input coupled an output of said second address register, said second memory configured with data stored in first and second ones of said data storage locations to represent a second digital filter for said second occurring virus pattern;

transferring data over a feedback path from an output of said second memory to an input of said second register, for transferring said data from said first one of said data storage locations in said second memory to said first portion of said second address register in response to said start signal value, for concatenation with said x-bit words from said serial data stream to form an address for said second one of said data storage locations of said second memory;

outputting a security alarm value from said second one of said data storage locations of said second memory having a virus pattern security alarm value stored therein, which is output when said second portion of said characteristic virus pattern is detected by said second digital filter;

counting occurrences of said second portion of said characteristic virus pattern in said data stream, with a counter coupled to said virus pattern security alarm value output, and outputting a count value as an event vector; and receiving said event vector and in response thereto, performing security monitoring and control operations on a data communications medium providing said data stream.

37. The method of claim 36, wherein said first address register and said first addressable memory are formed in a first multi-tasking memory partition of a data processor; and said second address register and said second addressable memory are formed in a second multi-tasking memory partition of said data processor, coupled to said first memory partition.

38. The method of claim 36, which further comprises:
reconfiguring said first addressable memory by storing new data in said first and second ones of said data storage locations to represent a third digital filter for a third occurring virus pattern, in response to said event vector.

39. The method of claim 36, which further comprises:
decoupling said first memory from said second address register and coupling said first memory to a third address register, for receiving said start signal value from said first memory, in response to said event vector.

40. A method for adaptive, active security monitoring of a serial stream of data having a characteristic virus pattern including a first occurring and a second occurring virus pattern portions, comprising the steps of:

receiving x-bit words from said serial data stream, in a first n-bit address register having a first portion with n-x bits and an second portion with two bits and an input to said second portion coupled to said serial stream;

accessing a first addressable memory having a plurality of data storage locations, each having a first portion with n-x bits, said first memory having an n-bit address input coupled an output of said first address register, said first memory configured with data stored in first and second ones of said data storage locations to represent a first digital filter for said first occurring virus pattern;

transferring data over a feedback path from an output of said first memory to an input of said first register, for transferring said data from said first one of said data storage locations in said first memory to said first portion of said first address register, for concatenation with said x-bit words from said serial bit stream to form an address for said second one of said data storage locations of said first memory;

outputting a start signal from said second one of said data storage locations of said first memory having a start signal value stored therein, which is output when said first occurring portion of said characteristic virus pattern is detected by said digital filter;

receiving x-bit words from said serial data stream, in a second p-bit address register having a first portion with p-x bits and a second portion with a plurality of x bits and an input to said second portion coupled to said serial stream, for receiving x-bit words from said serial data stream;

said second address register coupled to said first memory, for receiving said start signal value from said first memory;

accessing a second addressable memory having a plurality of data storage locations, each having a first portion with p-x bits, said second memory having a p-bit address input coupled an output of said second address register, said second memory configured with data stored in first and second ones of said data storage locations to represent a second digital filter for said second occurring virus pattern;

transferring data over a feedback path from an output of said second memory to an input of said second register, for transferring said data from said first one of said data storage locations in said second memory to said first portion of said second address register in response to said start signal value, for concatenation with said x-bit words from said serial data stream to form an address for said second one of said data storage locations of said second memory;

outputting an security alarm value from said second one of said data storage locations of said second memory having a virus pattern security alarm value stored therein, which is output when said second portion of said characteristic virus pattern is detected by said second digital filter.

41. The method of claim 40, wherein said first address register and said first addressable memory are formed in a first multi-tasking memory partition of a data processor; and said second address register and said second addressable memory are formed in a second multi-tasking memory partition of said data processor, coupled to said first memory partition.

42. An information collection architecture system for adaptive, active security monitoring of a serial stream of data having a characteristic virus pattern including a first occurring and a second occurring virus pattern portions, for performing security monitoring and control operations on a data communications medium providing said data stream, comprising:

a first n-bit address register having a first portion with n-x bits and an second portion with a plurality of x bits and an input to said second portion coupled to said serial stream, for receiving x-bit words from said serial data stream;

first addressable memory having a plurality of data storage locations, each having a first portion with n-x bits, said first memory having an n-bit address input coupled an output of said first address register, said first memory configured with data stored in first and second ones of said data storage locations to represent a first digital filter for said first occurring virus pattern;

a feedback path from an output of said first memory to an input of said first register, for transferring said data from said first one of said data storage locations in said first memory to said first portion of said first address register, for concatenation with said x-bit words from said serial data stream to form an address for said second one of said data storage locations of said first memory;

said second one of said data storage locations of said first memory having a start signal value stored therein, which is output when said first occurring portion of said characteristic virus pattern is detected by said digital filter;

a second p-bit address register having a first portion with p-x bits and a second portion with a plurality of x bits and an input to said second portion coupled to said serial stream, for receiving x-bit words from said serial data stream;

said second address register coupled to said first memory, for receiving said start signal value from said first memory;

second addressable memory having a plurality of data storage locations, each having a first portion with p-x bits, said second memory having a p-bit address input coupled an output of said second address register, said second memory configured with data stored in first and second ones of said data storage locations to represent a second digital filter for said second occurring virus pattern;

a feedback path from an output of said second memory to an input of said second register, for transferring said data from said first one of said data storage locations in said second memory to said first portion of said second address register in response to said start signal value, for concatenation with said bit from said serial data stream to form an address for said second one of said data storage locations of said second memory;

said second one of said data storage locations of said second memory having a virus pattern security alarm value stored therein, which is output when said second portion of said characteristic virus pattern is detected by said second digital filter;

a counter coupled to said virus pattern security alarm value output, for counting occurrences of said second portion of said characteristic virus pattern in said data stream, and outputting a count value as an event counter; and control means, coupled to said counter, for receiving said event vector and in response thereto, performing security monitoring and control operations on a data communications medium providing said data stream.

43. The system of claim 42, wherein said first address register and said first addressable memory are formed in a first integrated circuit chip; and said second address register and said second addressable memory are formed in a second integrated circuit chip, coupled to said first integrated circuit chip.

44. The system of claim 42, wherein said first address register and said first addressable memory are formed in a first multi-tasking memory partition of a data processor; and said second address register and said second addressable memory are formed in a second multi-tasking memory partition of said data processor, coupled to said first memory partition.

45. The system of claim 42, wherein said characteristic virus pattern is from a fiber optical distributed data interface (FDDI) data communications medium.

* * * * *